(12) United States Patent
Dingman et al.

(10) Patent No.: US 8,333,492 B2
(45) Date of Patent: Dec. 18, 2012

(54) ILLUMINATION MODULE FOR A VEHICLE

(75) Inventors: David A. Dingman, Grand Haven, MI (US); Brett A. Gorby, Grand Rapids, MI (US); Keith D. Foote, Grand Rapids, MI (US)

(73) Assignee: Donnelly Corporation, Holland, MI (US)

( * ) Notice: Subject to any disclaimer, the term of this patent is extended or adjusted under 35 U.S.C. 154(b) by 501 days.

(21) Appl. No.: 12/596,891

(22) PCT Filed: May 2, 2008

(86) PCT No.: PCT/US2008/062347
§ 371 (c)(1),
(2), (4) Date: Oct. 21, 2009

(65) Prior Publication Data
US 2010/0321946 A1 Dec. 23, 2010

Related U.S. Application Data

(60) Provisional application No. 61/025,048, filed on Jan. 31, 2008, provisional application No. 60/915,722, filed on May 3, 2007.

(51) Int. Cl.
*B60Q 1/26* (2006.01)
(52) U.S. Cl. .......................... 362/501; 362/509; 362/399
(58) Field of Classification Search .................. 362/501, 362/487, 545, 509, 520, 100, 399, 94, 546, 362/363, 544, 800
See application file for complete search history.

(56) References Cited

U.S. PATENT DOCUMENTS

| | | | |
|---|---|---|---|
| 4,041,301 | A | 8/1977 | Pelchat |
| 4,788,630 | A | 11/1988 | Gavagan |
| 4,972,173 | A | 11/1990 | Raciti |
| 5,040,103 | A | 8/1991 | Lyons |
| 5,233,375 | A | 8/1993 | Williams et al. |
| 5,297,010 | A | 3/1994 | Camarota et al. |
| 5,371,659 | A | 12/1994 | Pastrick et al. |
| 5,497,305 | A | 3/1996 | Pastrick et al. |

(Continued)

FOREIGN PATENT DOCUMENTS
DE 10212794 6/2003
(Continued)

OTHER PUBLICATIONS

PCT International Search Report for PCT Application No. PCT/08/62347 (WO 2008/137634).

*Primary Examiner* — Bao Q Truong
(74) *Attorney, Agent, or Firm* — Gardner, Linn, Burkhart & Flory, LLP

(57) ABSTRACT

An illumination module for a vehicle includes at least one illumination source for illuminating a target area at the vehicle. The illumination module may be mounted at a handle of a vehicle door and may be operable to illuminate the handle region and/or pocket region of the vehicle door and to illuminate a ground region adjacent to the vehicle and generally below the door handle assembly. The illumination module may include an icon established thereat and the at least one illumination source may back light the icon so that the icon, when the illumination module is activated, is viewable by a person viewing the vehicle. The illumination module may project or direct the illumination toward a targeted area so that the icon is discernible at the targeted area.

12 Claims, 17 Drawing Sheets

U.S. PATENT DOCUMENTS

| | | |
|---|---|---|
| 5,497,306 A | 3/1996 | Pastrick |
| 5,581,230 A | 12/1996 | Barrett |
| 5,669,699 A | 9/1997 | Pastrick et al. |
| 5,671,996 A | 9/1997 | Bos et al. |
| 5,786,772 A | 7/1998 | Schofield et al. |
| 5,823,654 A | 10/1998 | Pastrick et al. |
| 5,929,786 A | 7/1999 | Schofield et al. |
| 5,938,321 A | 8/1999 | Bos et al. |
| 6,002,341 A | 12/1999 | Ohta et al. |
| 6,062,613 A | 5/2000 | Jung et al. |
| 6,070,998 A | 6/2000 | Jennings et al. |
| 6,086,229 A | 7/2000 | Pastrick |
| 6,139,172 A | 10/2000 | Bos et al. |
| 6,149,287 A | 11/2000 | Pastrick et al. |
| 6,152,590 A | 11/2000 | Furst et al. |
| 6,158,869 A | 12/2000 | Barnes, Jr. |
| 6,164,805 A | 12/2000 | Hulse |
| 6,168,302 B1 | 1/2001 | Hulse |
| 6,174,016 B1 | 1/2001 | Ponziani |
| 6,176,602 B1 | 1/2001 | Pastrick et al. |
| 6,186,650 B1 | 2/2001 | Hulse et al. |
| 6,193,399 B1 | 2/2001 | Hulse |
| 6,198,409 B1 | 3/2001 | Schofield et al. |
| 6,217,201 B1 | 4/2001 | Hulse |
| 6,227,689 B1 | 5/2001 | Miller |
| 6,238,074 B1 | 5/2001 | Hulse et al. |
| 6,244,734 B1 | 6/2001 | Hulse |
| 6,247,343 B1 | 6/2001 | Weiss et al. |
| 6,260,991 B1 | 7/2001 | Hulse |
| D446,438 S | 8/2001 | Ciaramitaro et al. |
| 6,273,579 B1 | 8/2001 | Holloway |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,299,333 B1 | 10/2001 | Pastrick et al. |
| 6,304,168 B1 | 10/2001 | Ohta et al. |
| 6,315,419 B1 | 11/2001 | Platzer, Jr. |
| 6,347,880 B1 | 2/2002 | Furst et al. |
| 6,349,450 B1 | 2/2002 | Koops et al. |
| 6,390,529 B1 | 5/2002 | Bingle et al. |
| 6,396,408 B2 | 5/2002 | Drummond et al. |
| 6,416,208 B2 | 7/2002 | Pastrick et al. |
| 6,416,209 B1 | 7/2002 | Abbott |
| 6,477,464 B2 | 11/2002 | McCarthy et al. |
| 6,522,451 B1 | 2/2003 | Lynam |
| 6,523,888 B1 | 2/2003 | Yan et al. |
| 6,550,103 B2 * | 4/2003 | Koops et al. ............ 16/412 |
| 6,561,667 B2 | 5/2003 | Stapf |
| 6,568,839 B1 | 5/2003 | Pastrick et al. |
| 6,577,228 B1 | 6/2003 | Tsuchida et al. |
| 6,582,109 B2 | 6/2003 | Miller |
| 6,616,313 B2 | 9/2003 | Furst et al. |
| 6,623,124 B2 | 9/2003 | Okura |
| 6,669,267 B1 | 12/2003 | Lynam et al. |
| 6,690,268 B2 | 2/2004 | Schofield et al. |
| 6,710,471 B1 | 3/2004 | Schmitz |
| 6,717,712 B2 | 4/2004 | Lynam et al. |
| 6,779,372 B2 | 8/2004 | Arlt et al. |
| 6,793,385 B2 | 9/2004 | Tiesler et al. |
| 6,809,630 B1 | 10/2004 | Dreimann et al. |
| 6,812,823 B2 | 11/2004 | Inaba et al. |
| 6,824,281 B2 | 11/2004 | Schofield et al. |
| 6,847,289 B2 | 1/2005 | Pang et al. |
| 6,848,818 B2 | 2/2005 | Huizenga |
| 6,854,870 B2 | 2/2005 | Huizenga |
| 6,871,887 B2 | 3/2005 | Jooss et al. |
| 6,907,643 B2 * | 6/2005 | Koops et al. ............ 16/438 |
| 6,924,735 B2 | 8/2005 | Ueda et al. |
| 6,926,431 B1 | 8/2005 | Foote et al. |
| 6,926,432 B2 | 8/2005 | Rodriguez Barros et al. |
| 6,969,101 B2 | 11/2005 | Lynam et al. |
| 6,977,619 B2 | 12/2005 | March et al. |
| 6,981,789 B2 | 1/2006 | Assinder et al. |
| 7,005,959 B2 | 2/2006 | Amagasa et al. |
| 7,049,940 B2 | 5/2006 | Ieda et al. |
| 7,055,997 B2 | 6/2006 | Baek |
| 7,065,439 B2 | 6/2006 | Sakakura |
| 7,091,836 B2 | 8/2006 | Kachouh et al. |
| 7,097,312 B2 | 8/2006 | Platzer, Jr. |
| 7,104,675 B2 | 9/2006 | Chen |
| 7,121,688 B2 | 10/2006 | Rempel |
| 7,126,456 B2 | 10/2006 | Boddy et al. |
| 7,175,321 B1 | 2/2007 | Lopez |
| 7,175,324 B2 | 2/2007 | Kwon |
| 7,188,963 B2 | 3/2007 | Schofield et al. |
| 7,188,981 B2 | 3/2007 | Rodriguez Barros et al. |
| 7,192,171 B2 | 3/2007 | Rodriguez Barros et al. |
| 7,195,381 B2 | 3/2007 | Lynam et al. |
| 7,199,317 B2 | 4/2007 | Ieda et al. |
| 7,210,715 B2 | 5/2007 | Kobayashi et al. |
| 7,210,798 B2 | 5/2007 | Belliveau |
| 7,244,054 B2 | 7/2007 | Chou |
| 7,255,451 B2 | 8/2007 | McCabe et al. |
| 7,255,464 B2 | 8/2007 | Rodriguez Barros et al. |
| 7,258,471 B2 | 8/2007 | Rodriguez Barros et al. |
| 7,261,446 B2 | 8/2007 | Thomas |
| 7,270,452 B2 * | 9/2007 | Wang ................ 362/501 |
| 7,274,501 B2 | 9/2007 | McCabe et al. |
| 7,289,037 B2 | 10/2007 | Uken et al. |
| 7,344,284 B2 | 3/2008 | Lynam et al. |
| 7,350,949 B2 | 4/2008 | Meinke |
| 7,407,203 B2 | 8/2008 | Huizenga et al. |
| 7,438,453 B2 | 10/2008 | Saitoh et al. |
| 7,492,281 B2 | 2/2009 | Lynam et al. |
| 7,524,092 B2 | 4/2009 | Barros et al. |
| 7,581,859 B2 | 9/2009 | Lynam |
| 7,607,809 B2 | 10/2009 | Misawa |
| 7,626,749 B2 | 12/2009 | Baur et al. |
| 7,635,210 B2 | 12/2009 | Metros et al. |
| 7,878,693 B2 | 2/2011 | Liesener |
| 7,988,305 B2 | 8/2011 | Itoh et al. |
| 2004/0233677 A1 | 11/2004 | Su et al. |
| 2005/0036329 A1 | 2/2005 | Henschel et al. |
| 2005/0117364 A1 | 6/2005 | Rennick et al. |
| 2005/0285717 A1 * | 12/2005 | Ieda et al. ............ 340/5.72 |
| 2006/0038418 A1 | 2/2006 | Huizenga et al. |
| 2006/0226953 A1 | 10/2006 | Shelley et al. |
| 2007/0097698 A1 | 5/2007 | Song et al. |
| 2007/0203618 A1 | 8/2007 | McBride et al. |
| 2007/0206383 A1 | 9/2007 | Broude et al. |
| 2008/0018127 A1 | 1/2008 | Schindler et al. |
| 2008/0061933 A1 | 3/2008 | Ieda et al. |
| 2009/0040306 A1 | 2/2009 | Foote et al. |
| 2009/0115631 A1 | 5/2009 | Foote et al. |
| 2009/0161379 A1 | 6/2009 | Liesener |
| 2010/0321945 A1 | 12/2010 | Lang et al. |

FOREIGN PATENT DOCUMENTS

| | | |
|---|---|---|
| EP | 1284335 | 2/2003 |
| EP | 1304260 | 4/2003 |
| EP | 1690736 | 8/2006 |
| EP | 1738959 | 1/2007 |
| GB | 2341365 | 3/2000 |
| GB | 2342212 | 4/2000 |
| WO | 2005035308 | 4/2003 |
| WO | 2008051910 | 5/2008 |

* cited by examiner

ILLUMINATION MODULE FOR A VEHICLE

CROSS REFERENCE TO RELATED APPLICATIONS

The present application is a 371 application of PCT Application No. PCT/US08/062347, filed May 2, 2008, which claims the benefit of U.S. provisional applications, Ser. No. 61/025,048, filed Jan. 31, 2008, and Ser. No. 60/915,722, filed May 3, 2007, which are hereby incorporated herein by reference in their entireties.

FIELD OF THE INVENTION

The present invention relates to door handles for vehicles and, more particularly, to an exterior door handle for opening a side door of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door. It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654; and 5,497,305, which are hereby incorporated herein by reference in their entireties. Typically, such lighting devices provide illumination along the side of the vehicle and down to the ground at the side of the vehicle. Such illumination thus may have glare or bright spots at the side of the vehicle.

SUMMARY OF THE INVENTION

The present invention provides an illumination module or device for a vehicle, such as for an exterior door handle assembly, for providing light at the door handle pocket and at the ground at the side of the vehicle. Optionally, an interior door handle assembly may include an illumination module or device for providing light at the interior door handle pocket and/or at the interior of the vehicle in accordance with the present invention. Optionally, the illumination module may include a back lit icon or mask such that illumination emitted or projected by the illumination module toward a targeted area or surface may be in the form of the icon or mask as defined by lighter and darker regions of the projected or emitted or directed illumination at the targeted area or surface. Such an illumination module may be packaged in or incorporated into a door handle assembly or an exterior rearview mirror assembly or an interior rearview mirror assembly or the like, depending on the particular application and targeted area for illumination.

According to an aspect of the present invention, a door handle assembly for a door of a vehicle includes a base portion mountable to the vehicle door and a handle portion that is movably or pivotally mountable to the vehicle door. The door may define a pocket or recessed portion at its exterior side and generally at the door handle to provide clearance for a person to grasp the handle portion at the vehicle door for opening the door of the vehicle. The door handle assembly includes an illumination module that is operable (such as in response to actuation of a remote keyless entry device or a passive entry device or other activating event, such as a user inserting a key into a keyhole at the door or door handle or the like) to provide illumination generally downward and toward and to the ground at the side of the vehicle and generally at the door handle area and to provide illumination at the pocket at the vehicle door, so as to provide enhanced illumination at the vehicle door and door handle.

Optionally, the door handle assembly may include a light bar or strip disposed along an outer surface or region of the door handle portion to provide illumination along the door handle, if desired. Optionally, aspects of the present invention may be suitable for use with an interior door handle assembly disposed at an interior portion of a vehicle door, such as discussed below.

According to another aspect of the present invention, an illumination module includes an illumination source that backlights an iconistic element or optic, whereby a shadow or image of the icon or indicia of the iconistic element is projected or shown at a targeted region, such as at the ground adjacent to or proximate to the side of the vehicle. In one form, the illumination module may be disposed at a door handle of a side door of the vehicle. In another form, the illumination module may be disposed at an exterior rearview mirror at a side of the vehicle. In another form, the illumination module may be disposed at an interior rearview mirror of the vehicle, with the targeted region being at the windshield or dashboard of the vehicle or other interior location within the cabin of the vehicle.

Therefore, the present invention provides an illumination module for a door handle that is packaged at the small, substantially restricted area of the door handle of a vehicle. The illumination module includes optics and/or apertures and/or light blockers or guides that spread or diffuse and/or direct the emitted light to provide substantially even or uniform lighting so as to limit hot spots or bright spots or glare at the vehicle door or at the ground. The location of the illumination module is preferably selected so that a person's hand does not cover the illumination module when the person is grasping the door handle to open the door, such that illumination is maintained even when a person's hand is in the pocket region of the door and handle assembly. The location of the illumination module is also preferably selected so that the ground illumination port or portion of the module is substantially close to the vehicle door sheet metal so as to limit or substantially avoid hot spots or bright spots or glare at the vehicle door, while substantially uniform or even ground illumination and pocket illumination may be provided or enhanced via an optical elements, apertures, light guides or lenses or the like of the illumination module.

These and other objects, advantages, purposes and features of the present invention will become apparent upon review of the following specification in conjunction with the drawings.

DESCRIPTION OF THE PREFERRED EMBODIMENTS

Figure 1:
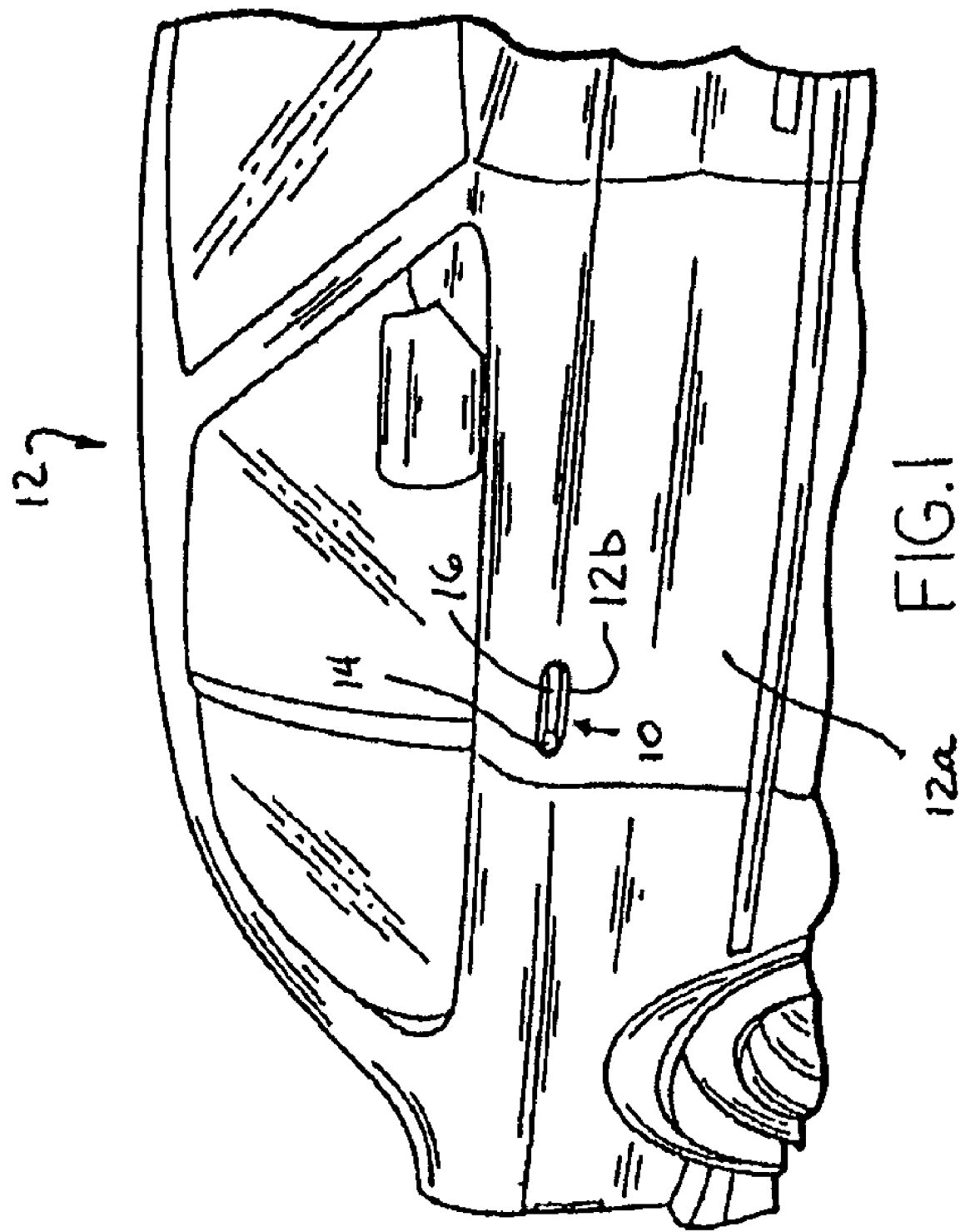
FIG. 1 is a perspective view of a vehicle with a door handle assembly in accordance with the present invention.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). Vehicle door handle assembly 10 includes a base portion or cap portion 14 that is mountable to a vehicle door and a handle or strap portion 16 that is pivotally mounted to the door or to a second or front base portion or bracket mounted to the door. Strap portion 16 is pivotable or movable or laterally movable relative to the door and the cap portion 14 to move an actuating lever or member or arm or bell crank or the like at cap portion, which in turn moves a cable or rod or linkage or the like to actuate or release the latch mechanism of the door to open the vehicle door. Door handle assembly 10 includes at least one illumination module 18 at the cap portion 14 and/or strap portion 16 for providing illumination at or toward a recess or cup region or pocket 12b of door 12a and for providing illumination at or toward the ground at the side of vehicle and generally at the door handle assembly, as discussed below.

Door handle assembly 10 may comprise any suitable type of door handle assembly, and may include or incorporate aspects of the door handle assemblies described in U.S. Pat. Publication No. US 2006/0038418, published Feb. 23, 2006, which is hereby incorporated herein by reference in its entirety. Handle or strap portion 16 includes a grasping portion 20 for a user to grab and pull at to open the vehicle door. The handle portion 16 also includes opposite end portions 22, 24 at opposite ends of the grasping portion 20. End portion 22 attaches to the linkages of the door mechanism at cap portion 14, while end portion 24 pivotally or movably or laterally movably attaches or mounts to the vehicle door or to a bracket or the like at the vehicle door. In the illustrated embodiment, end portion 24 of strap portion 16 includes an extension or arm 24a that extends toward and partially into the door for engaging an actuating arm or engaging end of an actuating lever or the like, whereby outward movement of end portion 24 imparts a movement of the actuating lever to open the vehicle door, such as in a known manner and/or such as described in U.S. Pat. Publication No. US 2006/0038418, published Feb. 23, 2006, which is hereby incorporated herein by reference in its entirety. Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door, such as a handle assembly of the types described in U.S. Pat. Nos. 6,349,450; 6,550,103; and 6,907,643, which are hereby incorporated herein by reference in their entireties) or other type of vehicle door handle assembly, while remaining within the spirit and scope of the present invention.

Figure 2:
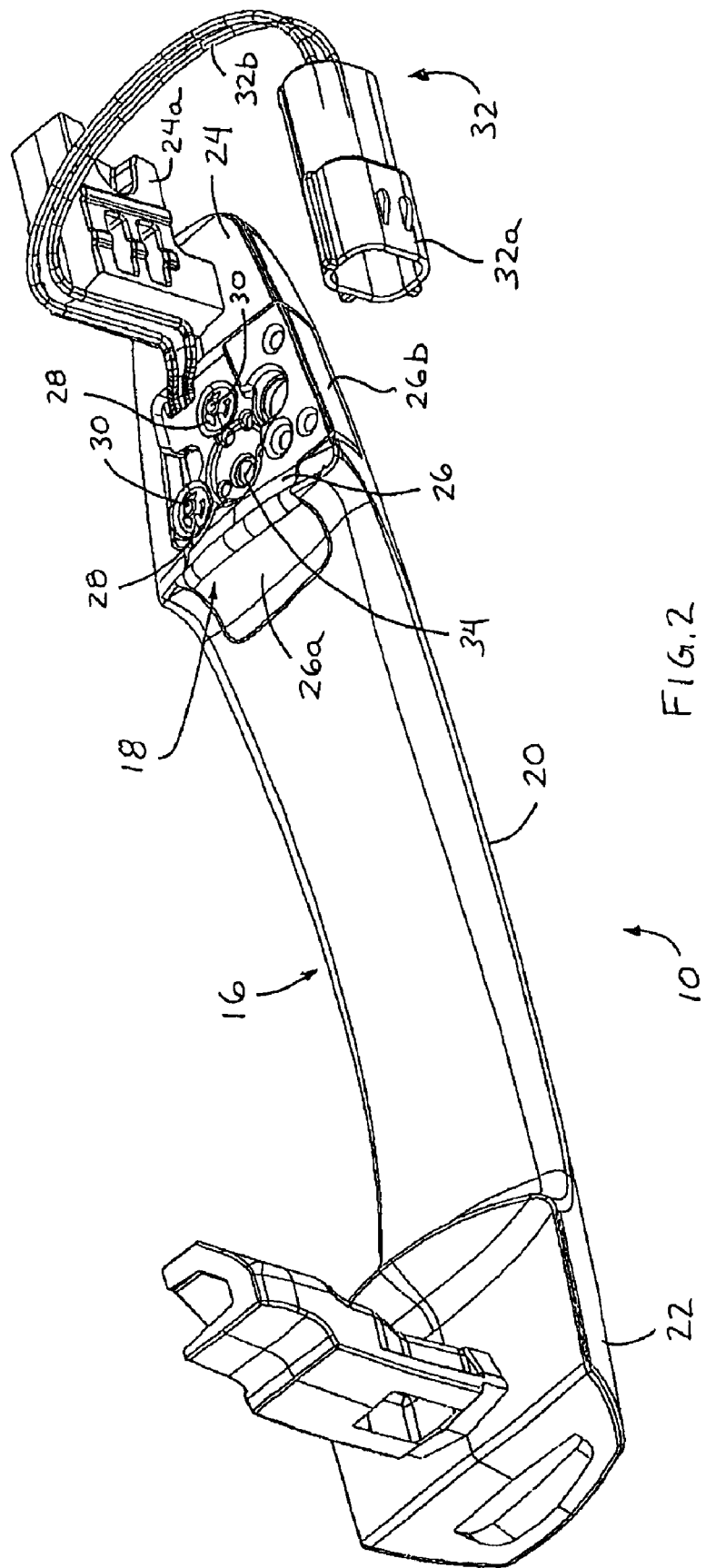
FIG. 2 is a perspective view of a door handle assembly of the present invention.
Figure 3:
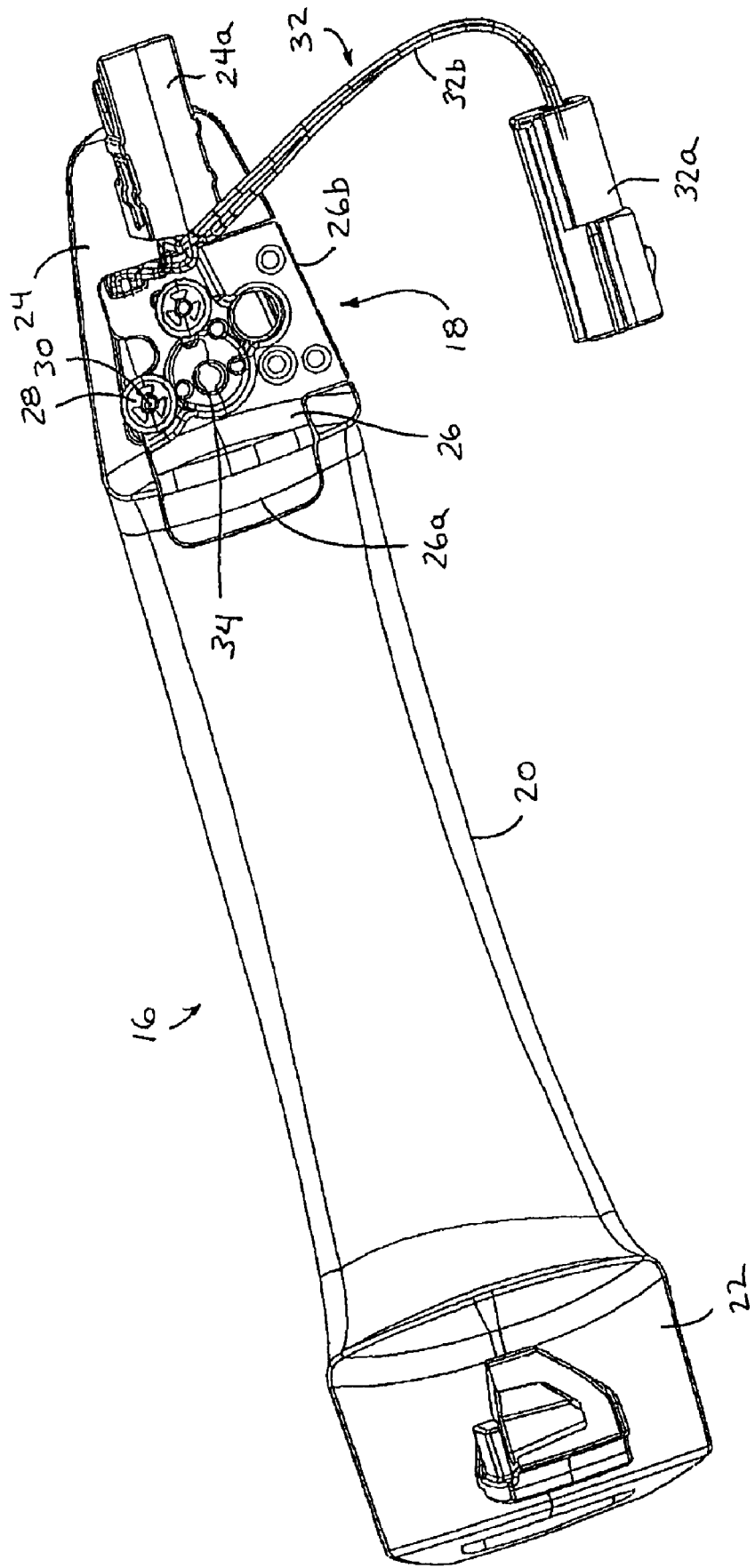
FIG. 3 is a plan view of the door handle assembly of FIG. 2.
Figure 4:
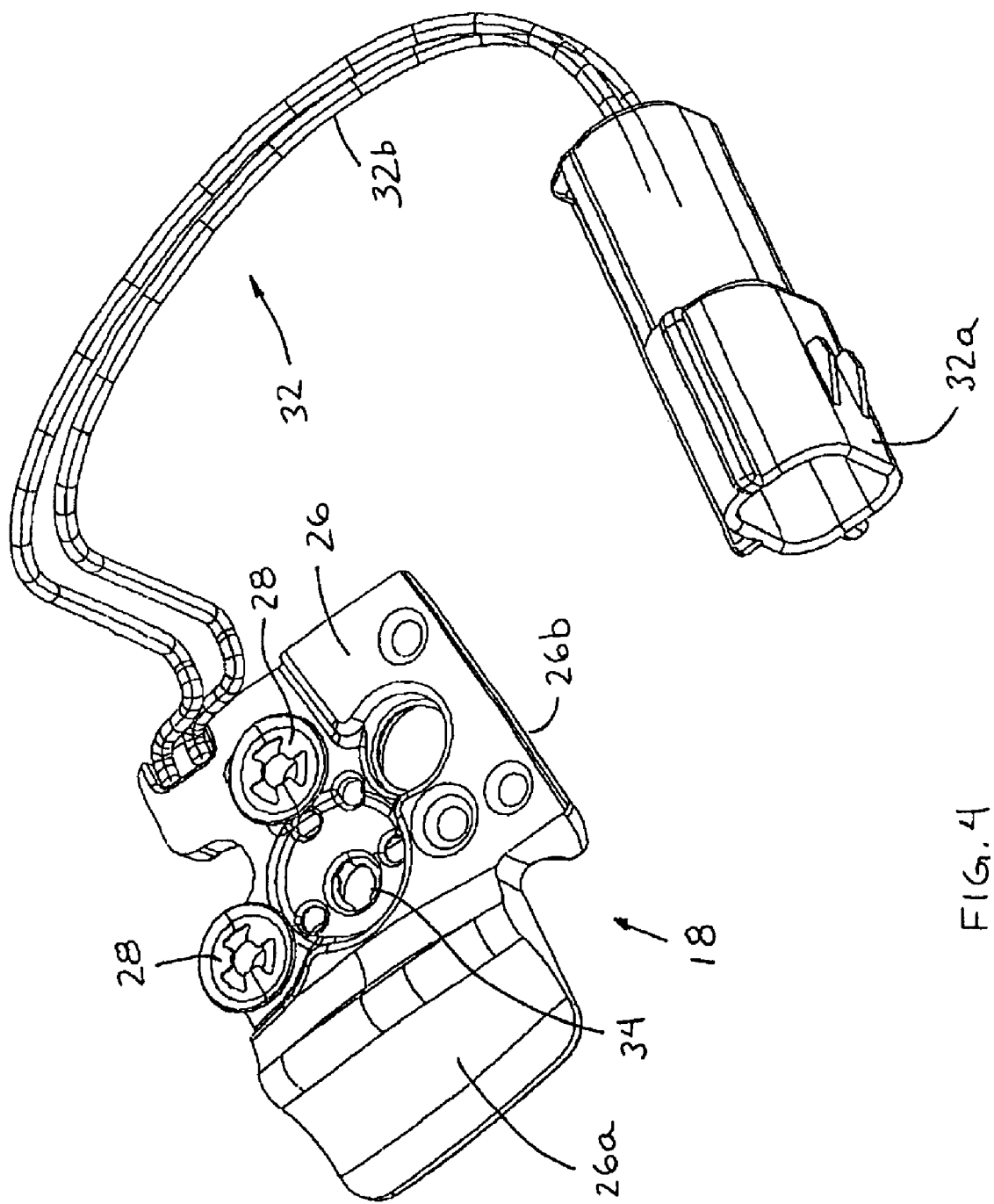
FIG. 4 is a perspective view of an illumination module of the door handle assembly in accordance with the present invention.

Optionally, and desirably, and as shown in FIGS. 2-4, illumination module 18 may be disposed at or near end 24 of strap portion 16. Illumination module 18 includes at least one illumination source or light source or light emitting diode (LED) that is operable to emit illumination, such as in response to a triggering or activating device or event. For example, the illumination source may be actuatable in response to at least one of a touch of the door handle, a movement of the strap or handle portion, actuation of a remote keyless entry module, or passive entry device, a motion detection at the vehicle, and an insertion of a key into a keyhole at the door handle. Preferably, the illumination source is deactuatable following a period of time after actuation of the illumination source. Optionally, the light module and/or illumination source or sources may have a dimming control feature or function, such that the illumination source, when activated, is ramped up or progressively powered up to its full illumination state, and when deactivated, is ramped down or dimmed or progressively powered down to its deactivated state.

The illumination source may comprise any suitable illumination source, such as one or more light emitting diodes (LEDs), such as white LEDs or high intensity power LEDs (such as the types described in U.S. Pat. Nos. 7,195,381 and/or 6,690,268, which are hereby incorporated herein by reference in their entireties) or organic light emitting diodes (OLEDs) or the like. The illumination source may comprise a substantially white light emitting illumination source, or may comprise a colored light emitting illumination source (or a white light emitting illumination source may emit light that passes through a color filter or the like) to provide color illumination (such as blue or other color as desired) at the door handle and ground area depending on the particular application of the door handle assembly and illumination module. For example, the illumination module may emit or transmit colored light that may match or correspond to the interior and/or exterior lighting of the particular vehicle to which the door handle assembly is mounted.

In the illustrated embodiment, illumination module 18 comprises a small, self-contained module that includes a housing 26 that substantially encases the illumination source and circuitry of the illumination module 18. The housing 26 includes an outer wall that substantially corresponds to the contours of the door handle assembly at the illumination module such that the door handle assembly has a substantially continuous outer surface or wall at the illumination module. The module and housing may be substantially sealed so as to be substantially impervious to water, dirt, debris and the like, so that the module is well suited for the exterior application at the vehicle door handle. The outer wall or walls of the housing are substantially flush with the outer surface and contours of the strap portion of the door handle assembly, and may be colored so as to substantially match or contrast the color of the strap portion and/or the color of the vehicle door, depending on the particular application of the door handle assembly and illumination module.

The housing 26 of illumination module 10 may be at least partially or substantially translucent or transparent at least at illumination regions 26a, 26b such that illumination emitted via the illumination source or illumination sources is transmitted through housing 26 at illumination regions 26a, 26b and toward the vehicle door or ground area, as discussed below. The illumination regions 26a, 26b may have a lens or aperture thereat and within the housing 26 to direct the light in the desired direction and in the desired manner. The illumination regions 26a, 26b of housing 26 may provide a diffusing optic or diffusing effect or frosting to diffuse or spread out the emitted light to provide substantially uniform illumination and to limit or substantially preclude bright spots at the vehicle door when the illumination source is activated.

Optionally, and desirably, the housing may be overmolded over the illumination source or sources and circuitry to provide a substantially sealed and substantially water impervious illumination module. For example, the housing may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

The illumination module preferably includes optics or apertures or elements (such as a lens or filter or other suitable optical element or the like) at the illumination regions 26a, 26b to spread or diffuse the emitted light to provide substantially even or uniform lighting so as to limit hot spots or bright spots or glare at the vehicle door or at the ground. The location and orientation of the illumination module is preferably selected (such as at or near an end of the strap portion of the door handle or at the cap portion of the door handle) so that a person's hand does not cover the illumination module when the person is grasping the door handle to open the door, such that illumination is maintained even when a person's hand is in the pocket region of the door and handle assembly. The location of the illumination module is also preferably selected (such as at the cap portion of the door handle) so that the ground illumination port or portion 26b of the module is substantially close to the vehicle door sheet metal so as to limit or substantially avoid hot spots or bright spots or glare at the vehicle door, while substantially uniform or even ground illumination may be provided or enhanced via an optical element or lens or the like of the illumination module.

Optionally, illumination module 18 may also include one or more apertures or baffles or light guiding or directing elements at or near the illumination source for guiding the illumination from the illumination source and through the respective illumination region 26a, 26b and toward the door handle region or pocket 12b or ground area, respectively. The baffles or apertures are positioned or oriented so as to direct the illumination emitted by the illumination source in the desired or appropriate direction so as to provide illumination at both of the targeted areas when the illumination source is activated. Preferably, the apertures or baffles light guiding elements are oriented so as to direct the illumination generally downwardly and toward the ground region and at least slightly outwardly from the vehicle to limit or substantially preclude direct illumination of the door or side of the vehicle to limit bright spots or glare at the door or side of the vehicle and generally below the door handle assembly.

Thus, the illumination module 18 comprises a single self-contained, sealed illumination module with one or more illumination sources or LEDs that are operable to illuminate both the door handle pocket region of the vehicle door and the ground area at the side of the vehicle and generally below the door handle assembly. The illumination of the dual regions via a single illumination module (and optionally via a single illumination source) provides a low cost illumination module that may be readily installed or mounted at the door handle to provide the desired illumination effect for the particular vehicle.

In the illustrated embodiment, the end 24 of the handle or strap portion 16 has a cutout or recess established therein for receiving the illumination module, whereby the illumination module is formed so that its illumination regions or portions 26a, 26b of housing 26 are generally flush with the respective exterior surfaces of the door handle. The surface finish of the illumination regions or portions 26a, 26b may substantially match or correspond to the surface finish of the door handle so that the illumination module is not readily viewable or visible or discernible to a person viewing the door handle when the illumination source is deactivated. The illumination module may be located or established at or in any exterior surface or wall of the door handle, such as in a metallic or plastic or polymeric portion of the door handle. The illumination portions of the housing of the illumination module may have any desired or suitable exterior finish, such as a class A surface finish, and may be colored or finished to any desired or suitable finish, such as a black or dark or colored finish (or the material may be black or dark or colored polymeric or metallic material). Optionally, the illumination portions may have a chrome finish or brushed aluminum finish or the like, such that illumination is provided through the chrome or brushed aluminum finished wall or structure of the door handle assembly.

The illumination module may include one or more attachment elements or features 28 for attaching the illumination module to the door handle. In the illustrated embodiment, the attachment elements comprise push on clips or rings that receive a mounting peg or post 30 of the door handle therethrough and frictionally engage the posts to resist or substantially preclude movement of the illumination module relative to the posts once the illumination module is seated at the door handle. The illumination module 10 may also include a wiring element or electrical connector 32 that extends from the housing 26 for electrically connecting (such as via a plug or socket 32a at the end of wires or leads 32b) the illumination module to a power source and/or control of the vehicle. The terminals or wires 32b may be electrically connected to circuitry of the illumination module, and the housing 26 may be overmolded over the connections to substantially seal and insulate the electrical connection of the connector to the illumination module circuitry. Optionally, the illumination module may include one or more other apertures or recesses 34 to assist in mounting and/or locating the illumination module at the door handle and/or for accommodating a fastener or element of the door handle, depending on the particular door handle assembly at which the illumination module is implemented.

The handle or strap portion (and/or optionally the cap portion) of the door handle assembly thus may be configured to receive the self-contained illumination module therein, such as at an opening or like at the outer wall of the strap portion. For example, the strap portion may have a recess or pocket for receiving the module at its exterior casing or wall. Optionally, the module may be mechanically secured within the pocket or opening, such as via a snap connection or fastener or the like, and may be electrically connected to a vehicle control system and/or vehicle power source. Optionally, the electrical connection and mechanical connection of the self-contained illumination module may be made as the module is snapped or otherwise inserted or mounted or attached to the cap portion of the door handle assembly, such as by utilizing aspects of the accessory modules described in U.S. Pat. Nos. 6,669,267; 6,969,101; 6,824,281; and/or 7,188,963, which are hereby incorporated herein by reference in their entireties. When snapped or otherwise secured to the door handle assembly, the exterior surface of the module may substantially correspond to the contours of the cap portion or strap portion of the door handle assembly so as to be substantially flush mounted at the door handle assembly to enhance the aerodynamic design of the door handle and to limit or reduce wind noise and the like at the illumination module and door handle assembly.

Thus, the illumination module may be configured as a sealed, self-contained illumination module with a lens or optical element, such as a simple lens, a potted design engineered lens or aperture, which may be configured to block or limit light glare at the door surface. The optic elements may comprise any suitable material, such as a clear polycarbonate, a polystyrene, an acrylic or the like, for environmental robustness. The physical size and shape and position of the apertures for the light output may be selected to provide the desired light output, such as a desired intensity, diffuseness and/or direction of illumination emanating from the illumination module when the illumination sources are activated. A texture or frosting of the lens or lenses or optical elements may also be provided to spread or diffuse the light output of the illumination module. The illumination module may also include a capacitor or capacitors to limit damage from electro-static discharge. The illumination module also includes resistors, which are selected to ensure the same or substantially the same net light output of the illumination sources of the illumination module. The housing is overmolded over the illumination source and circuitry of the illumination module to substantially seal the circuitry within the housing.

Figure 5:
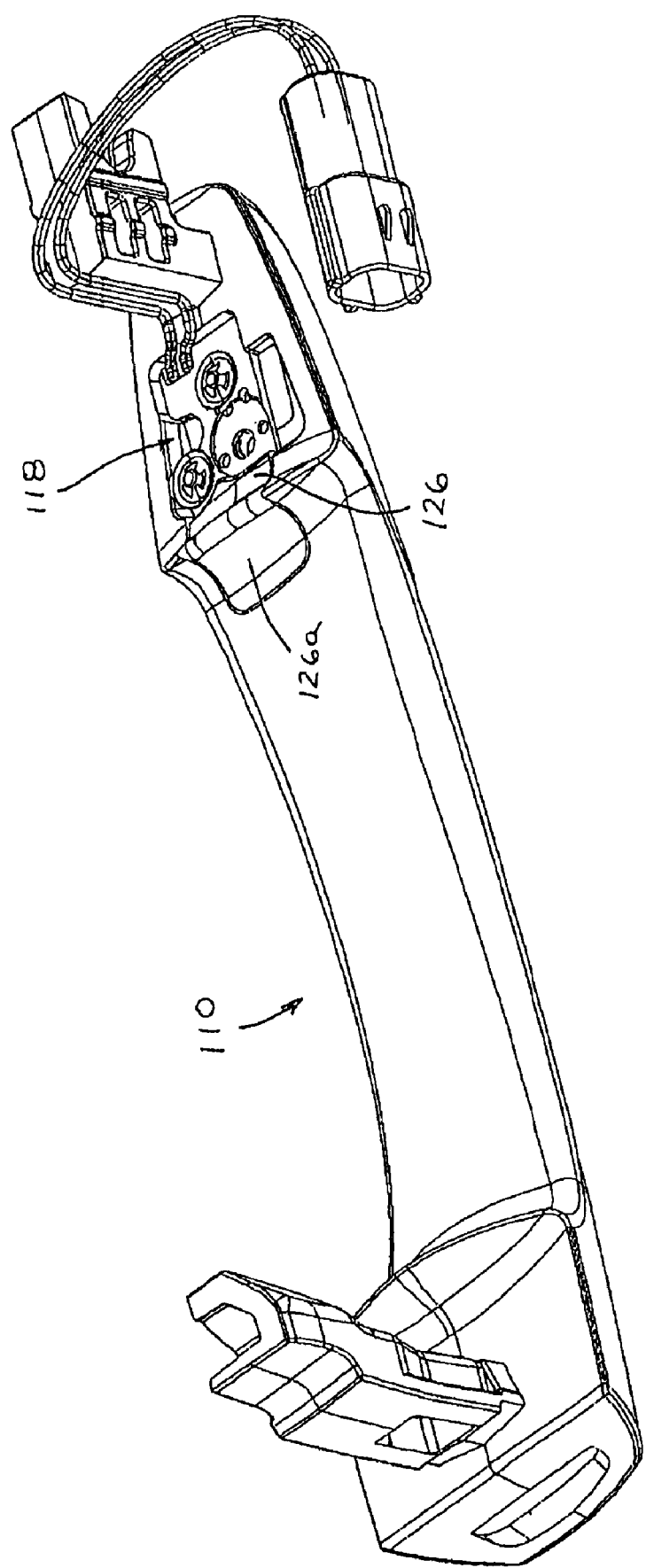
FIG. 5 is a perspective view of another door handle assembly of the present invention.
Figure 6:
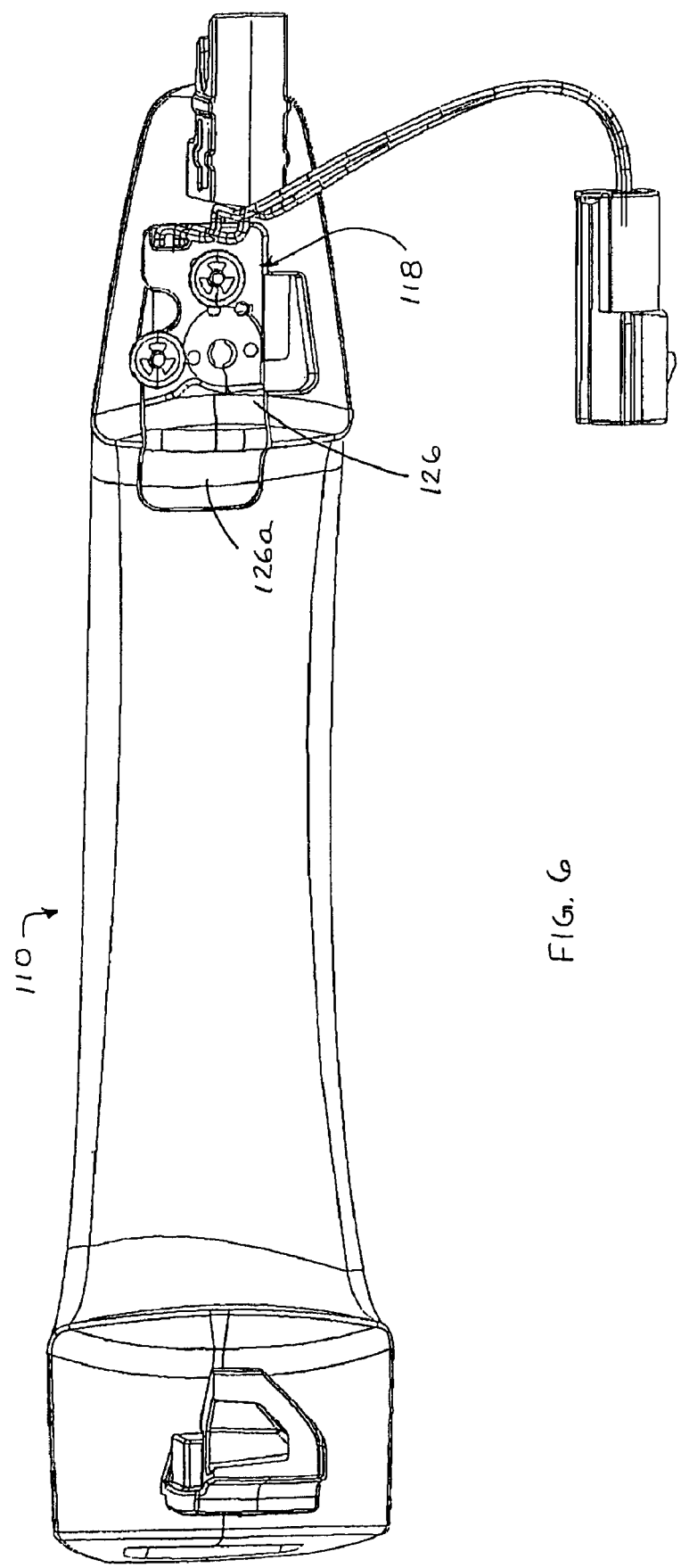
FIG. 6 is a plan view of the door handle assembly of FIG. 5.
Figure 7:
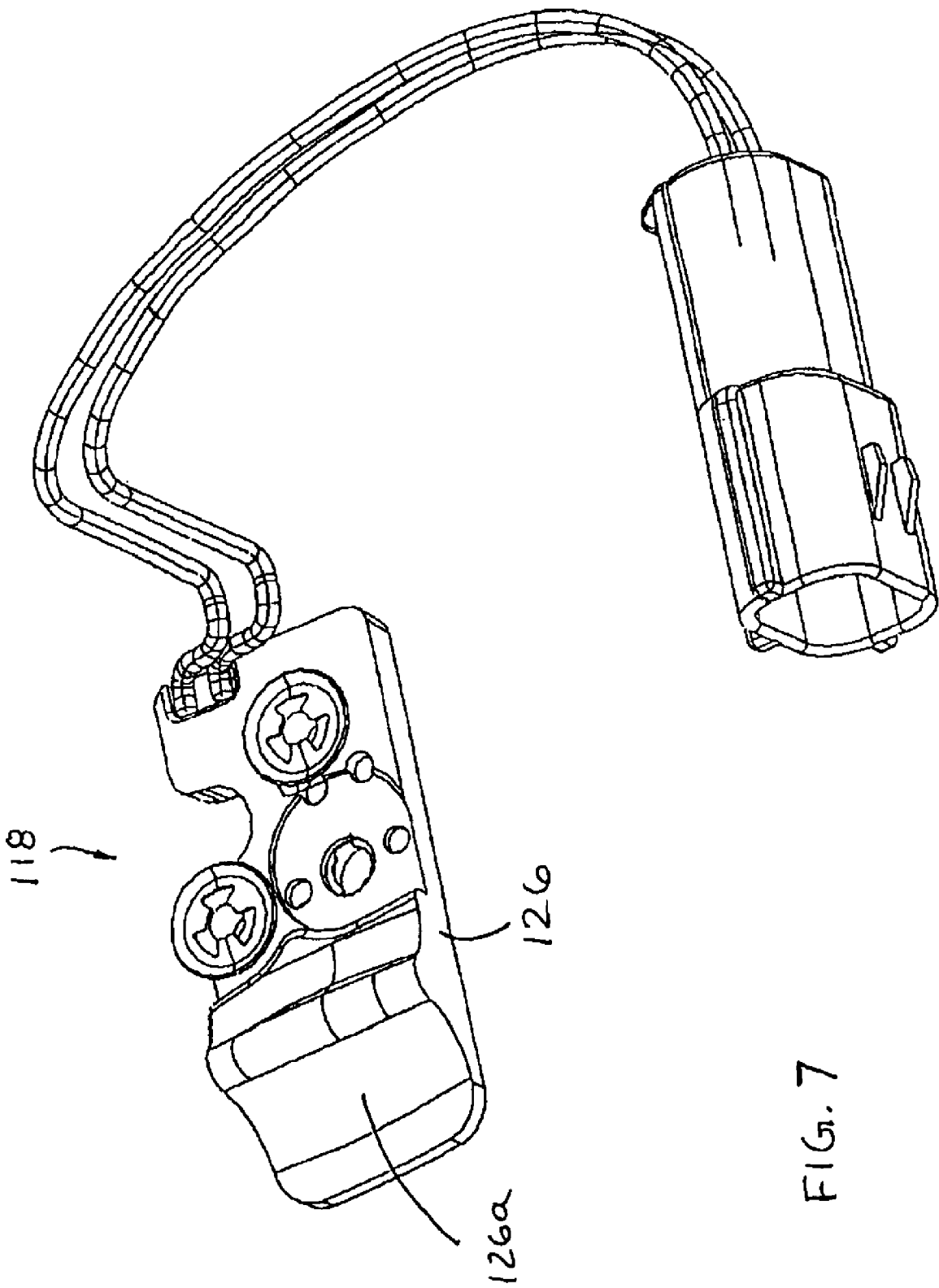
FIG. 7 is a perspective view of another illumination module of the door handle assembly in accordance with the present invention.

Optionally, and as shown in FIGS. 5-7, an illumination module 118 of a door handle assembly 110 may provide illumination of the door handle pocket region, without also providing the ground illumination function of illumination module 18, discussed above. In the illustrated embodiment, illumination module 118 includes an illumination portion or region 126a of a housing 126, whereby an illumination source of the illumination module has the light emitted therefrom guided and directed through illumination portion 126a and toward the door handle pocket of the vehicle door. Such an illumination module may be otherwise substantially similar to illumination module 18, discussed above, such that a detailed discussion of the illumination modules need not be repeated herein.

Optionally, an illumination module of the present invention may be disposed at the cap portion of a door handle assembly for providing ground illumination at the side of the vehicle, while a second illumination module may be disposed at the strap portion (such as at the front end of the strap portion opposite the cap portion or elsewhere along the strap portion) for providing door handle cup illumination at the handle region of the vehicle door. The illumination modules may include transparent or translucent or diffuse covers or portions at their external portions or surfaces to provide the desired lighting effect when the illumination sources are activated. The illumination modules may otherwise be similar to illumination module 18, discussed above, such that a detailed discussion of the illumination modules need not be repeated herein.

Optionally, the door handle assembly of the present invention may include a vehicle emblem or the like that is back lit by the illumination source of the illumination module (or by another illumination source of the door handle assembly) such that the vehicle emblem or logo or icon is visible to a person viewing the vehicle from outside the vehicle when the illumination source is activated, but is substantially not viewable or discernible when the illumination source is deactivated. For example, the strap portion or cap portion of the door handle assembly may have an icon or indicia or character or the like etched (such as via laser etching or the like) in its surface (such as in its inner surface of the outer wall of the strap portion or cap portion), such that the etched portions are at least partially translucent. Thus, when the illumination source is activated, the illumination is transmitted through the translucent etched icon or indicia or logo or the like so that the icon or indicia or logo is viewable and discernible by a person viewing the vehicle door handle. Because the etchings may be established on or in or partially through an inner surface of the outer wall or portion of the strap or cap portion of the door handle assembly, the etched icon or indicia or logo is substantially not viewable or discernible when the illumination source is deactivated. Optionally, an icon or indicia or logo may be established at another portion of the vehicle, such as at or in or partially through a casing of an exterior mirror assembly of the vehicle or an exterior trim element or the like. Optionally, the illumination module may back light the icon or indicia or logo with a generally downwardly directed light source so that the icon or indicia or logo is projected as a shadow onto a targeted surface, such as onto the ground adjacent to or proximate to the respective side of the vehicle, as discussed in detail below with respect to FIGS. 10-17.

The etched and back lit icon or indicia or logo thus may provide an aesthetically pleasing icon at the door handle assembly that is episodically viewable when the illumination source is activated, such as in response to a touch of the door handle, a movement of the strap or handle portion, actuation of a remote keyless entry module, a passive entry device, a motion detection at the vehicle, and/or an insertion of a key into a keyhole at the door handle and/or the like. The indicia or logo may be etched or established at or in or behind or partially through any exterior surface or wall of the door handle (or elsewhere on the vehicle), such as in a metallic or plastic or polymeric portion of the door handle. The portion that is etched or treated or processed may have any desired or suitable exterior finish, such as a class A surface finish, and may be colored or finished to any desired or suitable finish, such as a black or dark or colored finish (or the material may be black or dark or colored polymeric or metallic material) or a chrome finish or brushed aluminum finish or the like.

Optionally, the illumination module may be operable to illuminate a lock cylinder (or a portion of the door handle at or near the lock cylinder) of the vehicle door or door handle assembly to assist a user in unlocking the vehicle door in low lighting conditions. Optionally, the door handle assembly may include an illumination source that is operable to illuminate the lock cylinder or portion of the vehicle door or door handle at or near the lock cylinder. The illumination source or illumination module may back light a portion of the door or door handle at or near the lock cylinder or may project or transmit illumination toward the lock cylinder to provide illumination at or near the lock cylinder. Such an illumination feature may be provided in response to a detection of a person or key or other identifying element approaching the vehicle, so that the lock cylinder of the door is illuminated to assist the user in unlocking the vehicle door in low lighting conditions.

Optionally, the door handle assembly may include a lighted strip or illumination bar along the door handle to illuminate the handle of the door when activated. For example, and with reference to FIG. 8, a door handle assembly 210 includes a base portion or cap portion (not shown in FIG. 8) that is mountable to a vehicle door and a handle or strap portion 216 that is pivotally or movably or laterally movably mounted to the door or to a second or front base portion or bracket 215 mounted to the door. An illumination module 218 is disposed at least partially within the handle or strap portion 216 so that a visible illumination element is disposed at or packaged on the face of the handle portion. In the illustrated embodiment, the illumination module provides a light guide or light bar or strip along the handle portion, and may include optics and/or apertures and/or light blockers or other elements or guides that spread or diffuse and/or direct the emitted light to provide substantially even or uniform lighting so as to limit hot spots or bright spots or glare at the door handle and/or at the vehicle door and/or at the ground.

In the illustrated embodiment, handle portion 216 includes a chrome strip 220 (or other trim strip, such as a dark colored or accent colored or vehicle colored plastic or metallic strip to provide a desired appearance of the door handle) along the outer surface of the handle portion and generally surrounding the illumination source or light bar or strip 218. The light strip 218 may comprise a light emitting diode or a strip of light emitting diodes for projecting/emitting illumination therefrom in a direction generally laterally outwardly from the door handle (and optionally generally downwardly to illuminate a ground area at the side of the vehicle if desired, and such as by utilizing light guides or baffles or guide elements or the like). Optionally, the light strip 218 may be disposed behind the chrome strip 220 so as to be viewable through the chrome strip 220 when the light strip is activated but substantially not viewable through the chrome strip when the light strip is deactivated (for example, the chrome strip may be partially light transmitting to allow for transmission of the light from the light strip through the chrome strip, but may be partially reflective so as to reflect light incident thereon so that the light strip is not readily viewable and discernible through the chrome strip when the light strip is not activated).

Optionally, the light strip 218 may be disposed behind other semi-transparent and partially light transmitting panels or layers or covers or elements, such that the light strip may be viewable when activated, but substantially not viewable or discernible behind the panel or layer or element when not activated. The partially light transmitting cover or panel or layer or element may be partially reflective or opaque or colored so as to provide an enhanced appearance to the door handle, where the illumination module or light strip is substantially hidden within the door handle and is viewable and discernible when activated or powered. The partially light transmitting cover or panel or layer or element may comprise a generally transparent or translucent element with a partially transmitting and partially opaque or reflective coating thereon or the element may be formed or dyed or colored with a material that allows for partial transmission of light therethrough and yet providing an opaque or reflective appearance at the door handle when the light strip is deactivated. Optionally, the cover material or coating may be selected to allow for transmission of light emitted by the light strip while substantially attenuating or reflecting light having other wavelengths, such as by utilizing aspects of the transflective mirror substrates described in U.S. Pat. No. 7,274,501, which is hereby incorporated herein by reference in its entirety.

Optionally, the door handle assembly 210 may include a capacitive sensor 222 (or other sensor or sensing device) for sensing the presence of a person at the door handle, so that the light strip 218 may be activated in response to a detected presence (such as in response to a detection of a person's hand at or near the door handle). Optionally, the sensor may detect the presence of a person and may recognize an authorized user or driver of the vehicle and the door may be automatically unlocked in response to such a detection. Optionally, the door handle assembly may include a locking button or input 224 at the handle portion to allow a person to lock the door of the vehicle by touching or activating the locking button 224. The door handle assembly 210 and/or the illumination module 218 may utilize aspects of the other door handle assemblies and/or illumination devices or modules discussed above, such that a detailed discussion of the door handle assemblies and/or illumination devices or modules need not be repeated herein.

Figure 8:
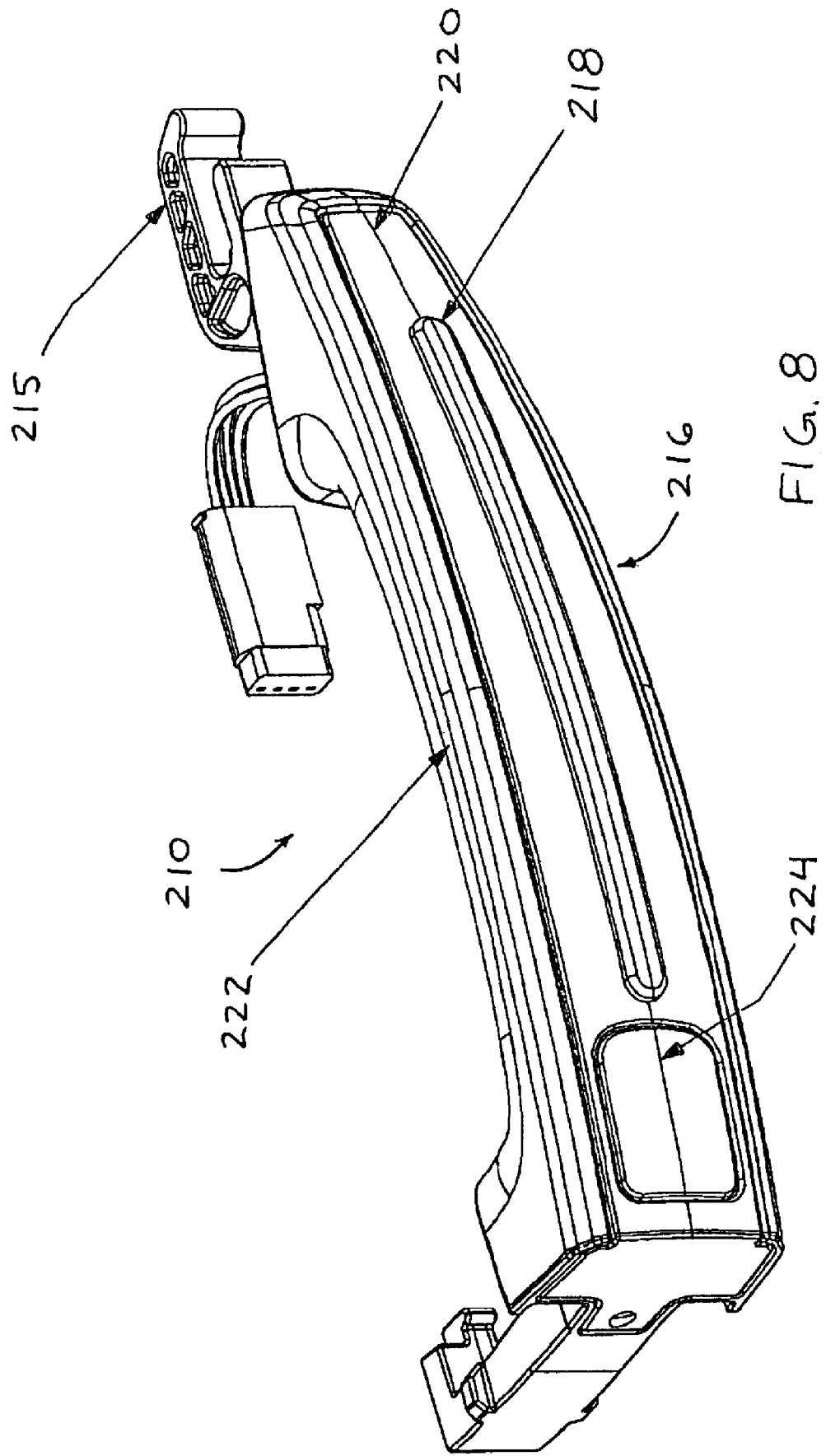
FIG. 8 is a perspective view of another door handle assembly in accordance with the present invention.

When utilizing a light bar on the surface of a handle, such as shown in FIG. 8, the location is on the Class A surface of the door handle and the person's hand may partially cover the light source during entry. However, the illumination may be provided as the person approaches the vehicle and before grasping the door handle so that the benefits of the illumination at the door handle are achieved before the person grasps the door handle to open the vehicle door. The illumination module or device may be activated by a passive entry system or tied into the vehicle's electrical structure to activate the illumination module of the door handle. Optionally, the light bar and/or the metallic strip may be provided in various colors that may be selected for the particular application and may be coupled with other exterior lighting schemes or trim color schemes to maintain a consistent lighting/trim theme for the vehicle.

Figure 9:
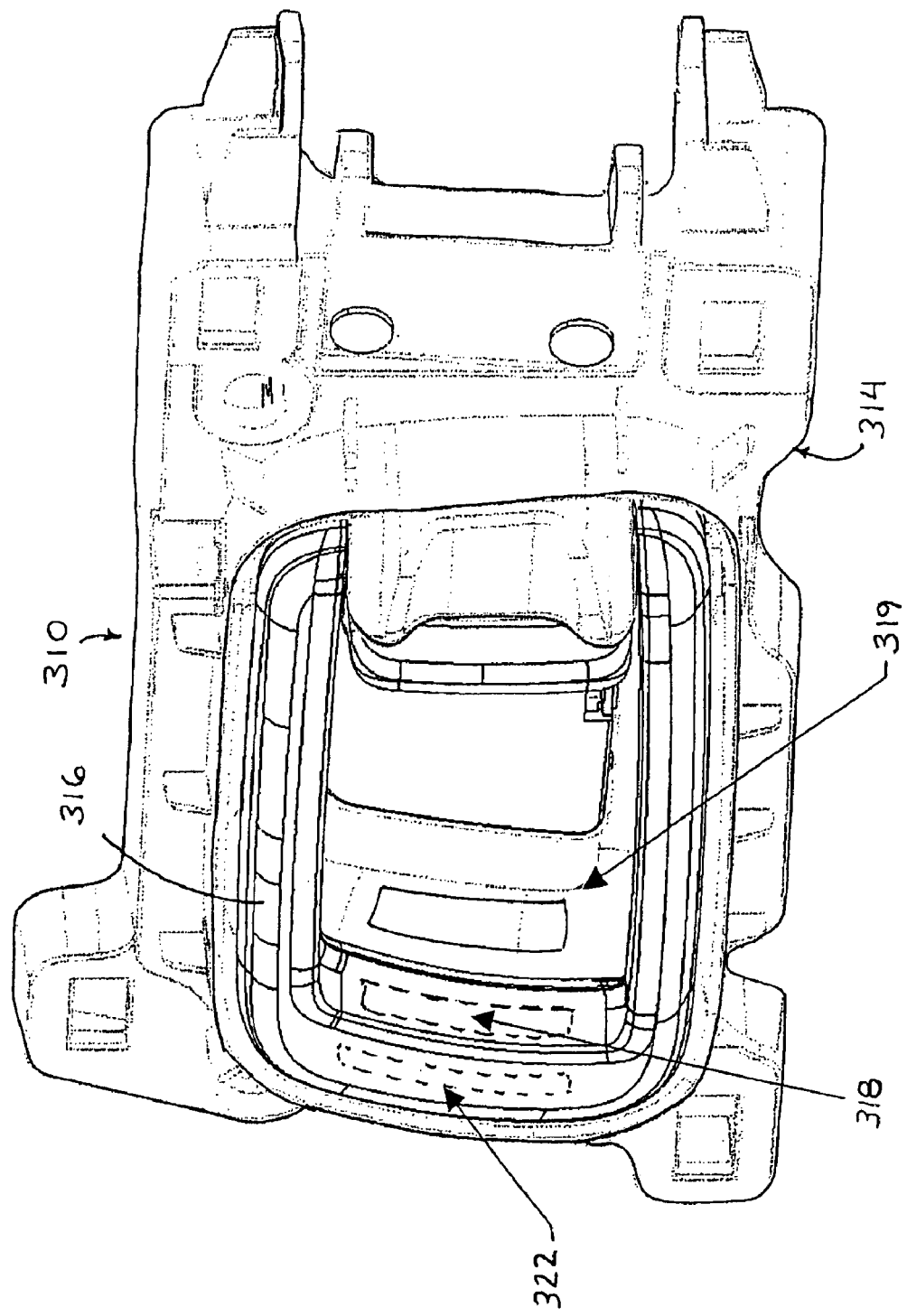
FIG. 9 is a perspective view of an interior door handle assembly in accordance with the present invention.

Optionally, a light module may be disposed at or incorporated in or at an interior door handle assembly of a vehicle, in accordance with the present invention. For example, and with reference to FIG. 9, an interior door handle assembly or module 310 is mountable at an interior portion or trim panel of a vehicle door and includes a base portion 314 that is mountable at or in a vehicle door and a handle portion 316 that is pivotally or movably or laterally movably mounted to the base portion. In the illustrated embodiment, the interior door handle assembly 310 includes a handle illumination module 318 disposed at least partially within the handle portion 316 and/or a base illumination module 319 disposed at a pocket region of the base portion 314. The handle illumination module 318 provides illumination along the handle portion, while the base illumination module 319 may provide illumination at the pocket region of the base portion to provide illumination at and/or around the handle portion to assist a user in recognizing the handle portion and grasping the handle portion to open the vehicle door from the inside of the vehicle. Optionally, the handle illumination module and/or the base illumination module may include optics and/or apertures and/or light blockers or other elements or guides that spread or diffuse and/or direct the emitted light to provide substantially even or uniform lighting so as to limit hot spots or bright spots or glare at the door handle and/or at the vehicle door and/or at the walls or floor of the vehicle cabin.

Optionally, the interior door handle assembly 310 may include a sensor or sensing device or element 322 (such as a capacitive sensor or the like) for detecting or sensing the presence of a person's hand at or near the handle portion (such as a person's hand that is feeling for the interior door handle as may be done in dark or low lighting conditions). The illumination source or module 318 and/or 319 may be activated in response to a detection of the presence of a person's hand at or near the door handle assembly to assist the user in locating the door handle to open the vehicle door. Thus, a person within the vehicle cabin may wave their hand along the interior panel of the vehicle door and near the door handle, whereby the illumination source or sources may be automatically activated or energized to generally illuminate the door handle or area or region at which the door handle is located, so that the user may readily view and discern the door handle and may then grasp the door handle to open the vehicle door.

Optionally, and desirably, the capacitive sensor that activates the lighting may be tied into or interconnected with or in communication with a vehicle controller or park switch or sensor or the like, so that when the driver places the vehicle in park (or out of a driving gear and/or reverse gear), the sensor becomes active and may trigger the lighting (either in response to a detection of the presence of a person's hand or in response to the vehicle being shifted into park). Likewise, when the vehicle is shifted out of park (such as into a driving gear or reverse gear or the like), the sensor becomes inactive and will not trigger the lighting even when a person's hand is at the door handle. This feature may be provided so that the sensor is not active when the vehicle is in a driving gear so that the handle will not be illuminated during driving of the vehicle, such as if someone leans against the door and triggers the light. Optionally, the sensor and/or lighting of the interior door handle may further be activated in response to an ambient light level so that the illumination is provided in darkened conditions, such as nighttime, but is not provided during higher lighting conditions, such as daytime conditions and the like.

Thus, the interior door handle assembly or module of the present invention provides a door handle assembly that has an illumination module or device for providing light at the door handle pocket for interior lighting inside the vehicle. The interior door handle assembly includes a base portion mountable to the vehicle door and a handle portion that is movably or pivotally mountable to the vehicle door panel. The door or interior panel or trim panel may define a pocket or recessed portion at it's inside and generally at the door handle area to provide clearance for a person to grasp the handle portion at the vehicle door for opening the door of the vehicle to exit. The door handle assembly includes an illumination module that is operable (such as in response to actuation of a remote keyless entry device or a passive entry device or other activating event, such as a user inserting a key into a keyhole at the door or door handle or the like) to provide illumination generally toward the inside of the vehicle and generally at the door handle area and to provide illumination at the pocket at the vehicle door, so as to provide enhanced illumination at the vehicle's inner door panel.

The illumination source or light source or LED may be mounted into the case or strap of the door handle, and may be activated in response to a capacitive sensor (such as a sensor mounted into the handle or case of the door handle) detecting the presence of a person's hand at or near the door handle. The lighting module may consist of an LED with an optical lens (or other light guiding element or device) to control the light output in a directed source or area. The LED driver and circuit board of the illumination device or module may be coupled with a light bar mounted into the handle or case of the door handle assembly. Optionally, various color of LEDs (or other suitable lighting elements or devices) may be utilized in concert with other interior lights of the vehicle to maintain the same color (or to provide a desired contrast or color scheme) throughout the interior of the vehicle. The interior door handle assembly 310 and/or the illumination module/modules 318, 319 may utilize aspects of the exterior door handle assemblies and/or illumination devices or modules discussed above, such that a detailed discussion of the door handle assemblies and/or illumination devices or modules need not be repeated herein.

Figure 10:
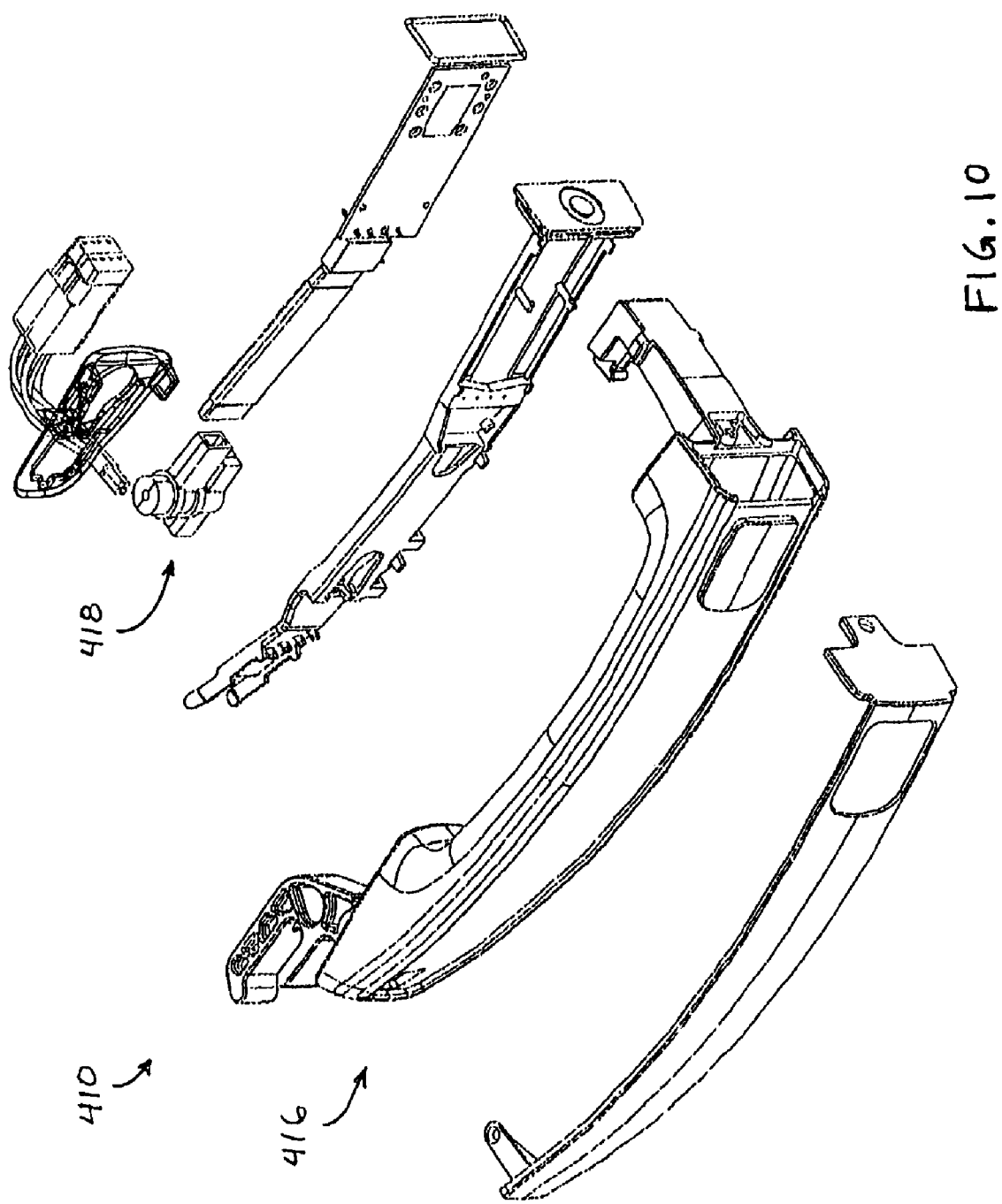
FIG. 10 is an exploded perspective view of another exterior door handle assembly having an illumination module in accordance with the present invention.
Figure 11:
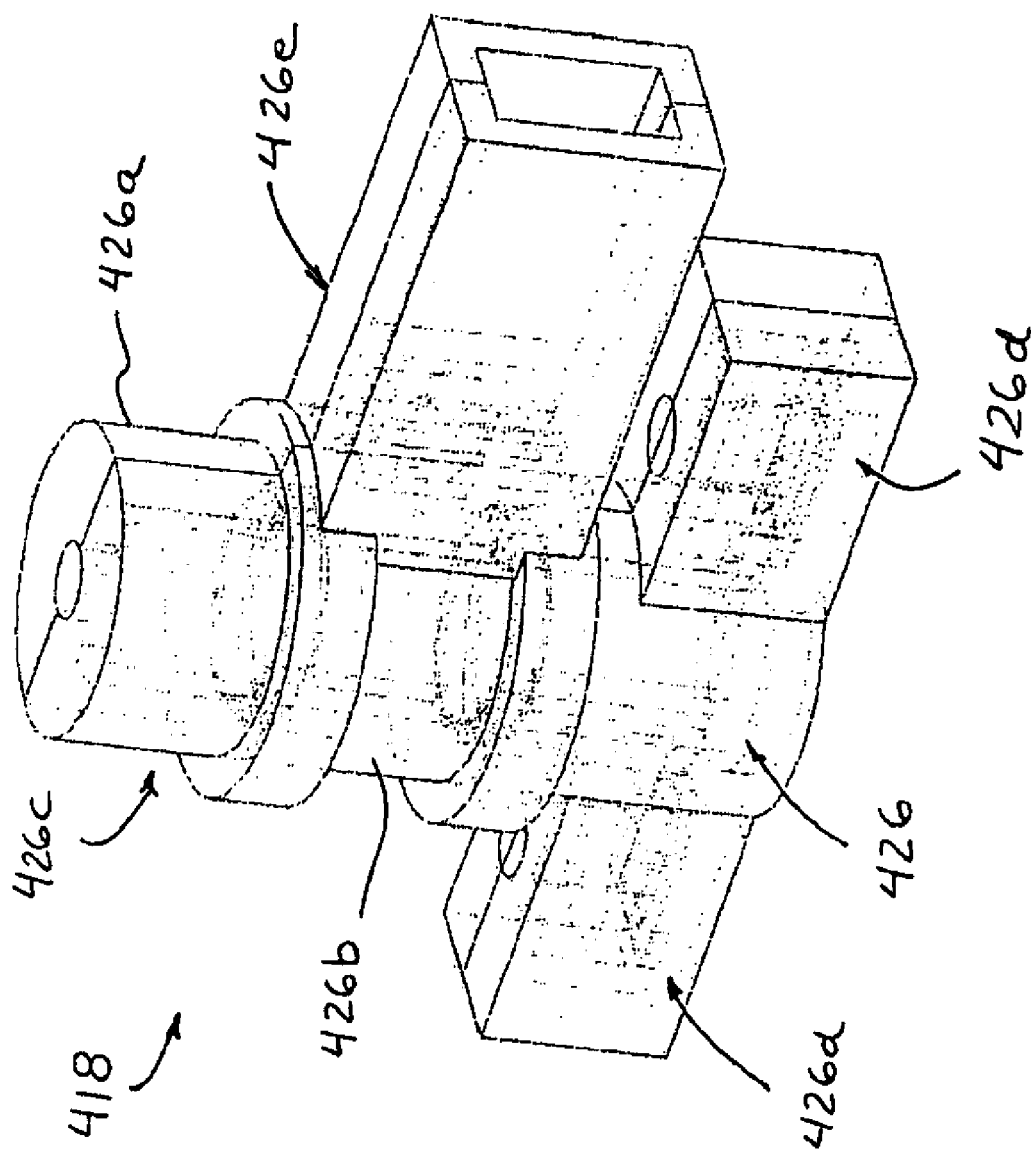
FIG. 11 is a perspective view of the illumination module of FIG. 10.
Figure 12:
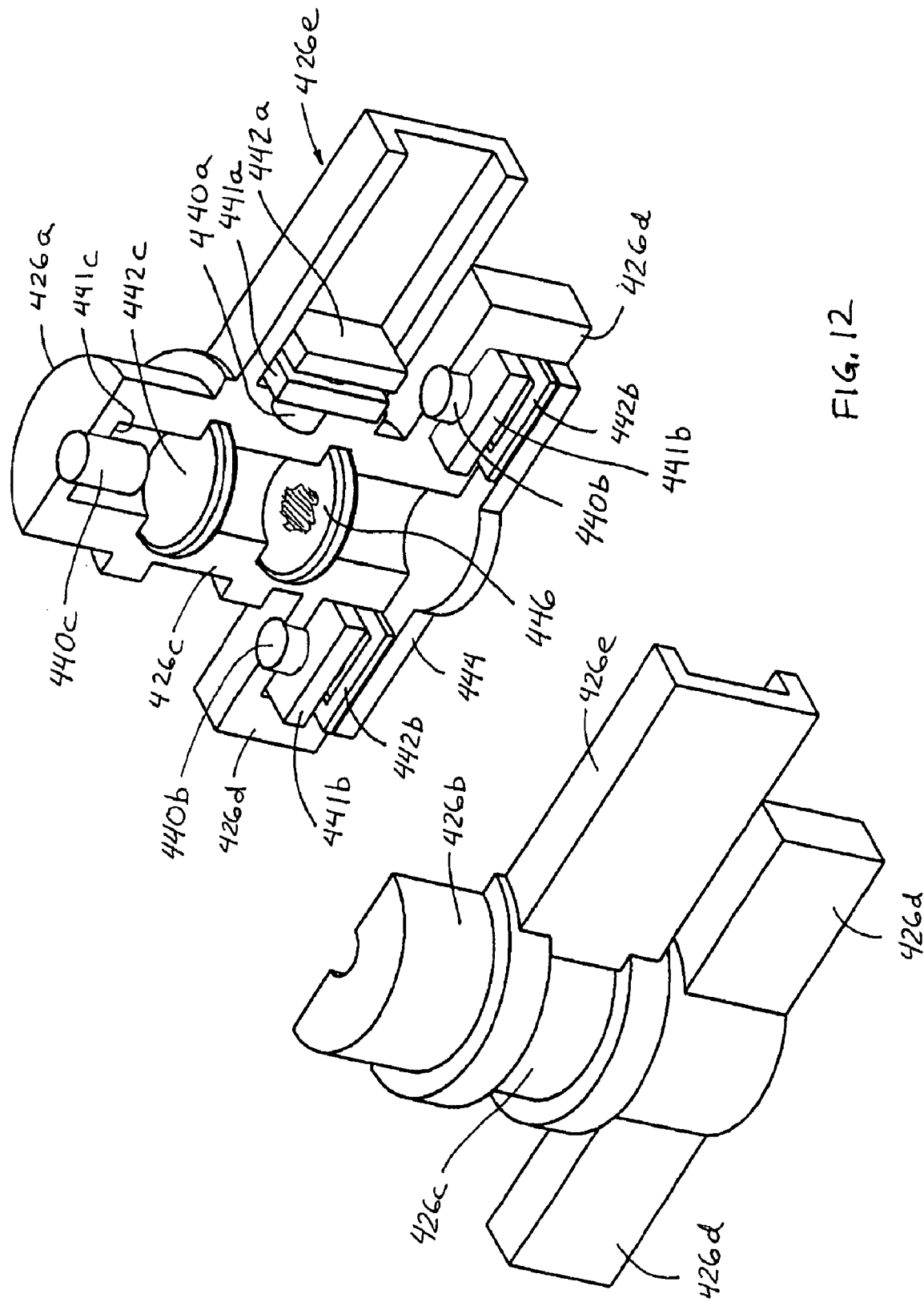
FIG. 12 is an exploded perspective view of the illumination module of FIG. 11.

Optionally, and with reference to FIGS. 10-12, an exterior door handle assembly 410 includes an illumination module 418 that is operable to illuminate the ground adjacent to or proximate to the side of the vehicle at which the door handle assembly 410 is located and that may also be operable to illuminate the pocket region or a portion of the door handle, such as in a similar manner as discussed above. In the illustrated embodiment, illumination module 418 is disposed at a forward end of the strap portion 416 of handle assembly, and may be disposed so that a downwardly directed portion may project or direct illumination generally downward and along the vehicle door to illuminate the ground area, while a rearwardly directed portion may project or direct illumination generally toward the door handle pocket at the exterior portion of the vehicle door.

As can be seen with reference to FIGS. 10-12, illumination module 418 includes a body or casing or housing 426 that houses illumination sources or LEDs or the like and that includes one or more optics or lenses through which the illumination is transmitted. In the illustrated embodiment, and as best shown in FIG. 12, housing 426 may comprise two halves 426a, 426b that cooperate to define or form a passageway or tube 426c and a pair of ground illumination portions 426d and a pocket illumination arm or portion 426e. The housing is mounted in the door handle so that the outer portions of the tube 426c and ground illumination portions 426d are generally coplanar with the lower surface of the door handle while the outer surface or portion of the pocket illumination arm or portion 426e is generally coplanar with the corresponding surface of the door handle. Optionally, the housing 426 may include one or more raised ribs or protrusions or rings to assist in mounting or securing or retaining the illumination module at and within the door handle.

The pocket illumination portion 426e houses a pocket illumination source or LED 440a (FIG. 12), which may be disposed at a circuit element or circuit board 441a or otherwise electrically connected to circuitry associated with power and/or control of the illumination source, and a pocket lens or optic 442a that are disposed at or within a passageway of the pocket illumination portion 426e. When activated, pocket illumination source 440a emits light through pocket lens 442a and into or toward the pocket at the vehicle door. The lens may comprise a clear or translucent lens or optic that may diffuse the light at the pocket so that the illumination module may provide a soft glow or substantially uniform illumination at the door handle pocket, such as in a similar manner as discussed above.

The ground illumination portions 426d each houses a ground illumination source or LED 440b, which may be disposed at a circuit element or circuit board 441b or otherwise electrically connected to circuitry associated with power and/or control of the illumination source. An outer lens 444 may be disposed at the lower or outer end of the housing 426 to provide an outer casing or panel at the door handle. Outer lens 444 may comprise a substantially transparent or translucent lens or optic through which illumination from illumination source 440b is transmitted. Illumination module 418 may also include a lens or optic 442b, such as a diffuser optic or the like, between illumination source 440b and outer lens 444 for diffusing or spreading out the illumination that is projected generally downwardly from illumination module 418.

The illumination module 418 may also be operable to back light an icon or indicia or logo and to project the icon or indicia or logo or shadow thereof downward so that a person at the side of the vehicle may view, when the illumination module is activated, the icon or indicia or logo or shadow thereof at the ground adjacent to or proximate the side of the vehicle. The icon or indicia or logo is established at or as a masking element or mask, with the mask comprising a light transmitting portion in the form of the icon or indicia or logo (such as by having a darkened portion in the form of the icon or by having a substantially transparent portion in the form of the icon). Thus, light emitted by the light source, when the light source is activated or powered, passes through the mask and out of the illumination module to illuminate the ground generally below the illumination module (or other targeted area or region generally proximate the illumination module). The illumination of the ground or targeted area follows the form of the mask such that the logo is reproduced via lighted and less lighted regions of the ground portion illuminated. Thus, a person viewing the illuminated ground portion or targeted area can discern the back lit icon or indicia or logo of the mask.

In the illustrated embodiment, illumination module 418 includes an icon illumination source or LED 440c, which may be disposed at a circuit element or circuit board 441c or otherwise electrically connected to circuitry associated with power and/or control of the illumination source, a focal lens or optic 442c and a second lens or icon optic 446 with the icon or indicia or logo or emblem established thereat. The icon illumination source 440c, focal lens 442c and icon optic 446 are disposed within tube portion 426c of housing 426 and cooperate to define an optic path between the icon illumination source and the icon optic so that illumination emitted by illumination source 440c, when activated, is directed along tube portion 426c and focused at icon optic 446 by focal lens 442c, whereby the illumination that transmits through icon optic 446 is directed further downward through outer lens 444 and toward the ground adjacent to or proximate the side of the vehicle. Thus, a person approaching or standing at the side of the vehicle may view (when the illumination module is activated, such as in response to a passive entry system or the like) the icon or logo or indicia at the ground by the vehicle. The icon may be formed by darkening a portion of the icon optic (whereby the icon may appear as a shadow surrounded by illumination) or by darkening the area of the icon optic surrounding the icon shape (whereby the illumination on the ground or targeted area is in the shape of the icon). Optionally, the illumination module may be configured to direct the icon image toward other targeted regions or areas, such as toward the surface of the vehicle door to provide the icon or indicia or logo at the vehicle door (and optionally the icon established at the icon optic may be established or formed to accommodate for the angle at which the icon is directed toward the door to reduce distortion of the icon when it is displayed at or projected onto the door).

Thus, the illumination module includes optics or apertures or elements (such as a lens or filter or other suitable optical element or the like) at the outer ends of the pocket illumination portion and the downward illumination portion to spread or diffuse the emitted light to provide substantially even or uniform lighting so as to limit hot spots or bright spots or glare at the vehicle door or at the ground. In the illustrated embodiment, the lower lens or optic 444 comprises a unitary optic for the ground illumination portions and the icon backlighting portion of the illumination module. Because the lower lens or optic thus may be substantially transparent or translucent or clear so as to not overly diffuse the icon image, the module may include a diffusing optic at each of the ground illumination portions to achieve the diffuse or spread out illumination at the ground by the vehicle.

The location and orientation of the illumination module is preferably selected (such as at or near an end of the strap portion of the door handle or at the cap portion of the door handle) so that a person's hand does not cover the illumination module when the person is grasping the door handle to open the door, such that illumination is maintained even when a person's hand is in the pocket region of the door and handle assembly. The location of the illumination module is also preferably selected (such as at the cap portion of the door handle) so that the ground illumination port or portion of the module is substantially close to the vehicle door sheet metal so as to limit or substantially avoid hot spots or bright spots or glare at the vehicle door, while substantially uniform or even ground illumination may be provided or enhanced via an optical element or lens or the like of the illumination module. The illumination module may be operable to provide illumination at the door handle pocket and/or at the ground area proximate the side of the vehicle in response to a user input or detection of a key fob or other device or in response to other activating means, such as described above. Illumination module 418 thus may function in a similar manner as the illumination modules discussed above, such that a detailed discussion of the illumination modules need not be repeated herein.

Figure 13:
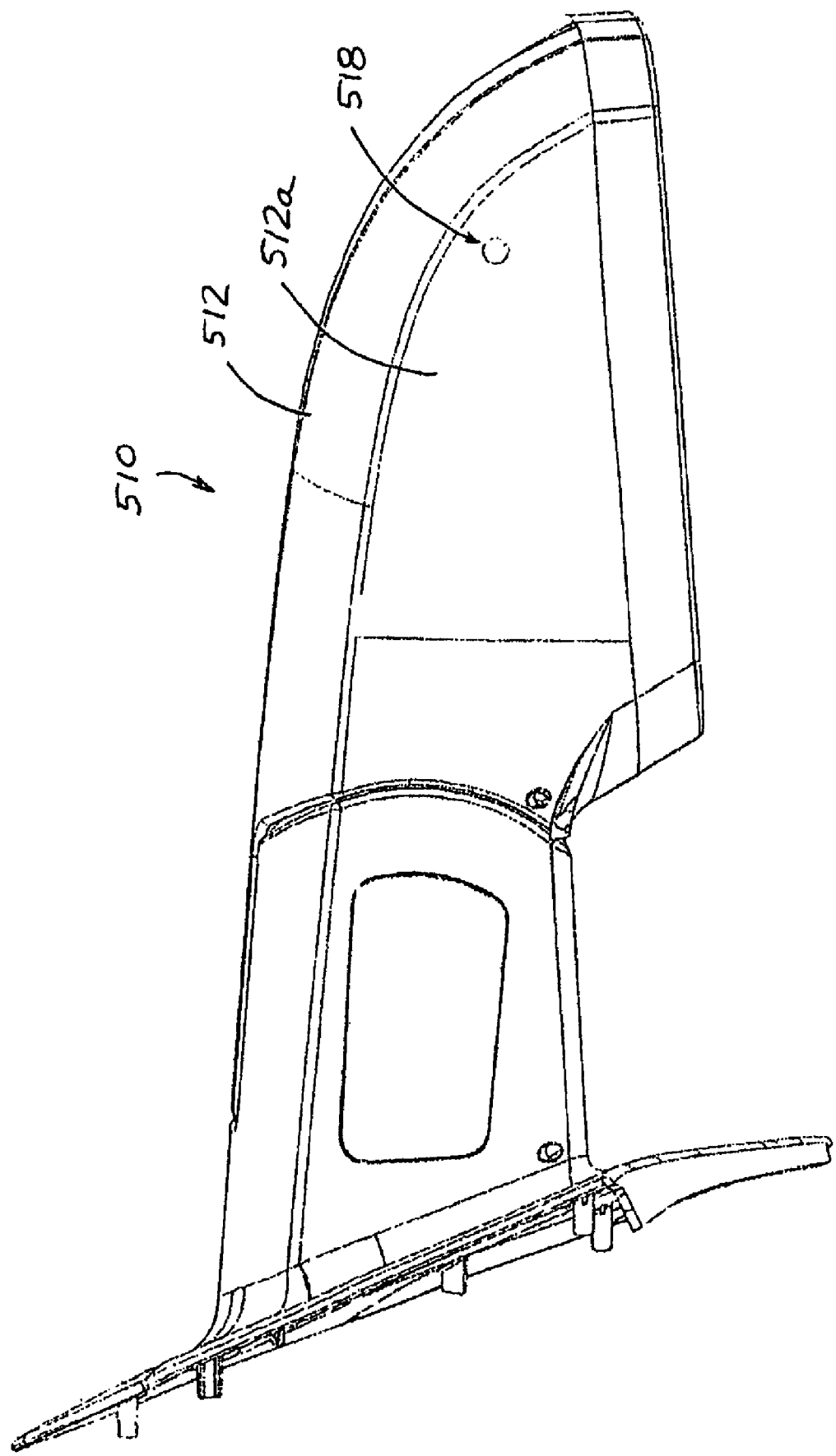
FIG. 13 is a bottom plan view of an exterior rearview mirror assembly having an illumination module in accordance with the present invention.
Figure 14:
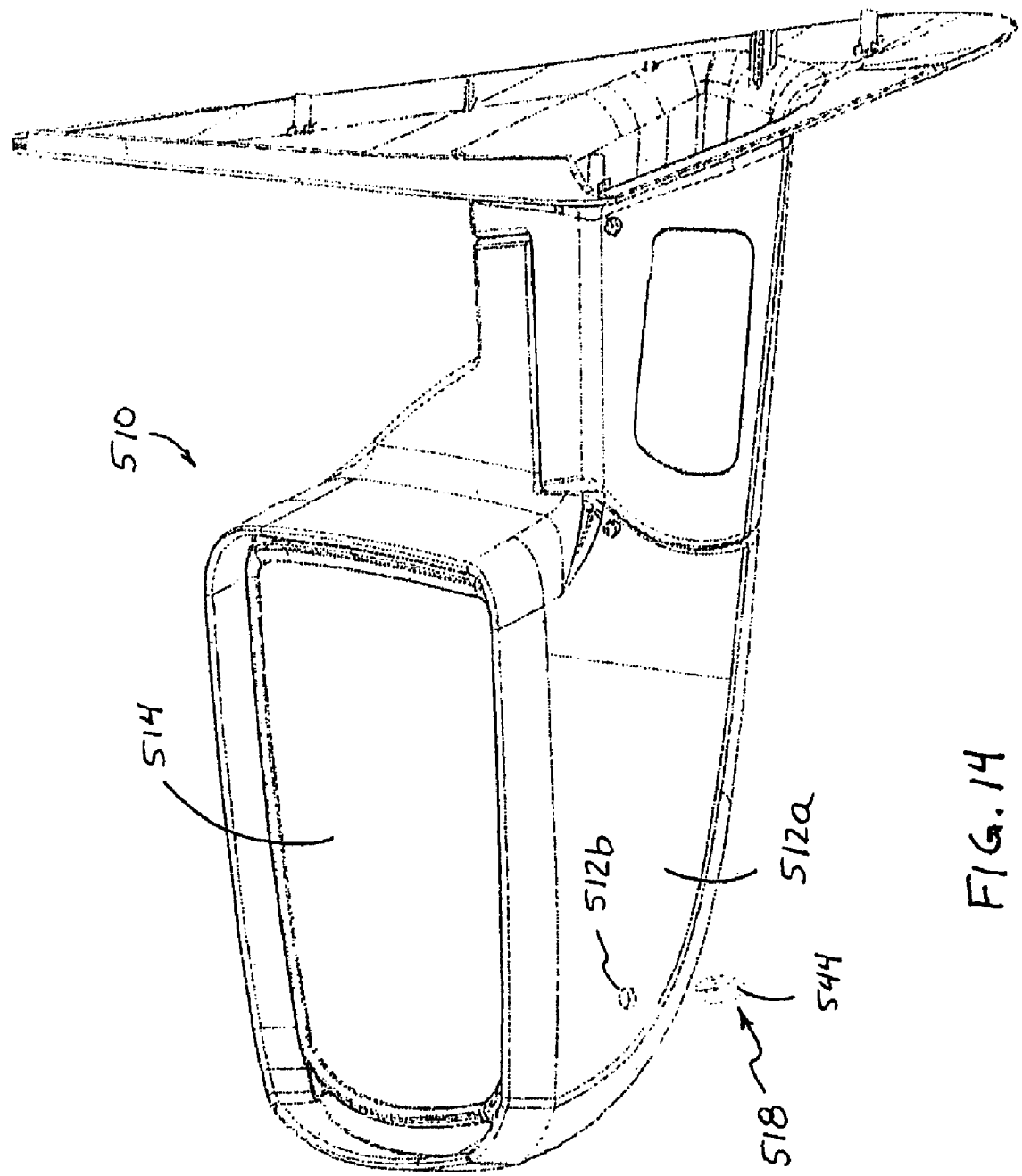
FIG. 14 is an exploded perspective view of the mirror assembly and illumination module of FIG. 13.
Figure 15:
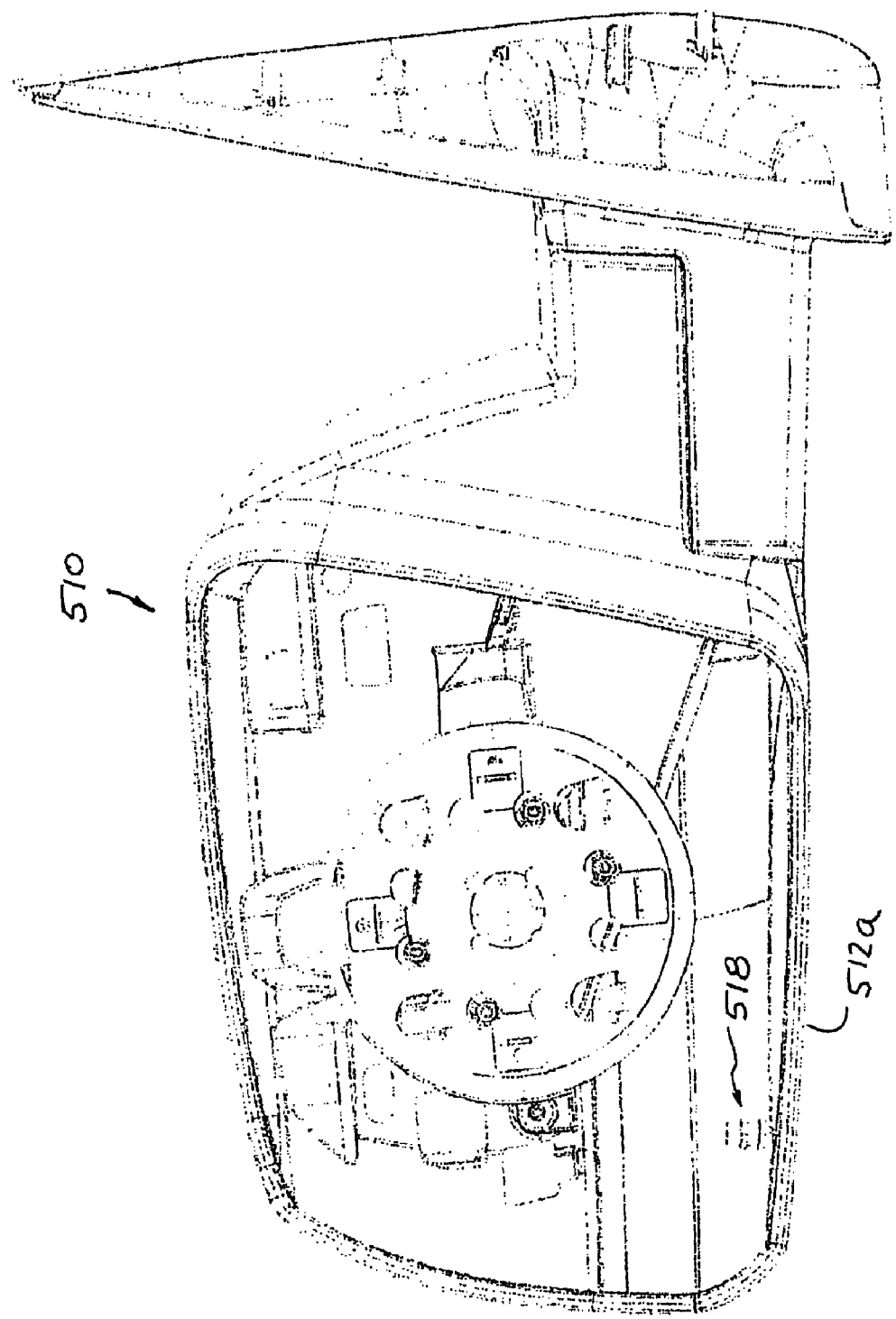
FIG. 15 is a rear plan view of the mirror assembly of FIG. 13, with the reflective element removed to show additional details.

Optionally, and with reference to FIGS. 13-17, an exterior mirror assembly 510 of a vehicle may include an illumination module 518 that is operable to back light an icon or indicia or logo to project an image of the icon or indicia or logo generally downward so as to be viewable at the ground adjacent the side of the vehicle, such as in a similar manner as described above. Illumination module 518 may be disposed at any suitable location at or near the lower side or portion of the mirror assembly, such as at an outboard region of the lower portion 512a of the mirror casing 512, such as shown in FIGS. 13-15.

In the illustrated embodiment, illumination module 518 comprises a generally cylindrical shaped module that is mounted at the lower portion 512a of mirror casing 512 (such as by being at least partially received in an aperture or opening 512b of mirror casing 512) with its lower surface or lens element 544 being located generally flush with the lower surface of the mirror casing 512 so that illumination module 518 is not readily viewable by a person viewing the mirror assembly at the side of the vehicle. As shown in FIG. 15, illumination module 518 may protrude into the cavity of the mirror casing 512 and may be disposed behind the reflective element 514 (not shown in FIG. 15), where electrical connection to the illumination module may be readily made via a wire or lead within the mirror casing.

Figure 17:
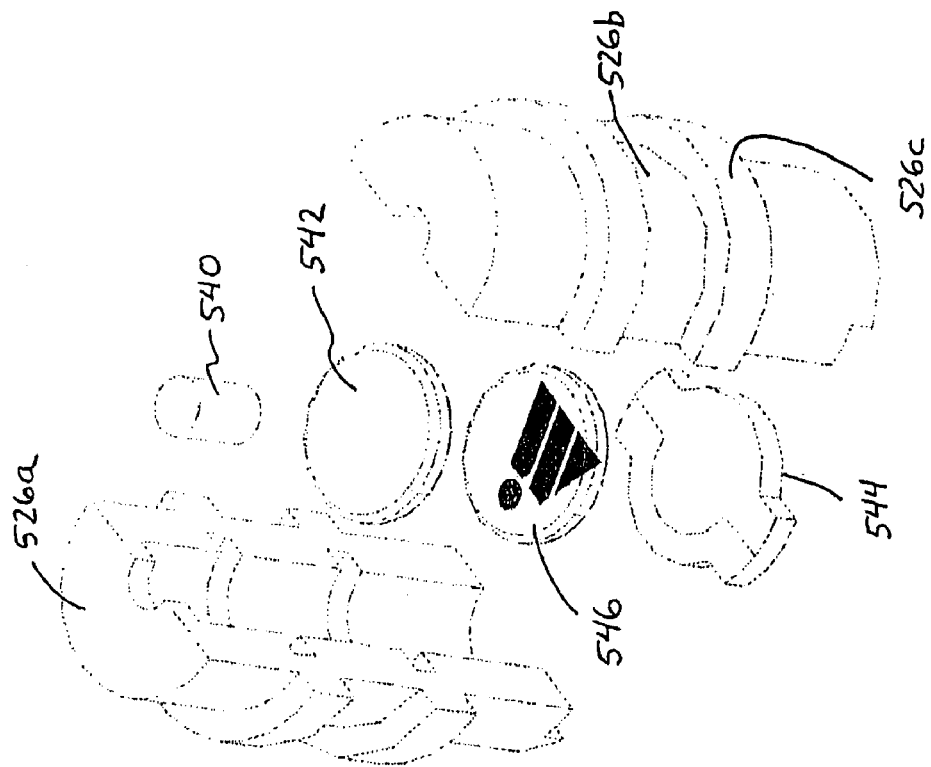
FIG. 17 is an exploded perspective view of the illumination module of FIG. 16.
Figure 16:
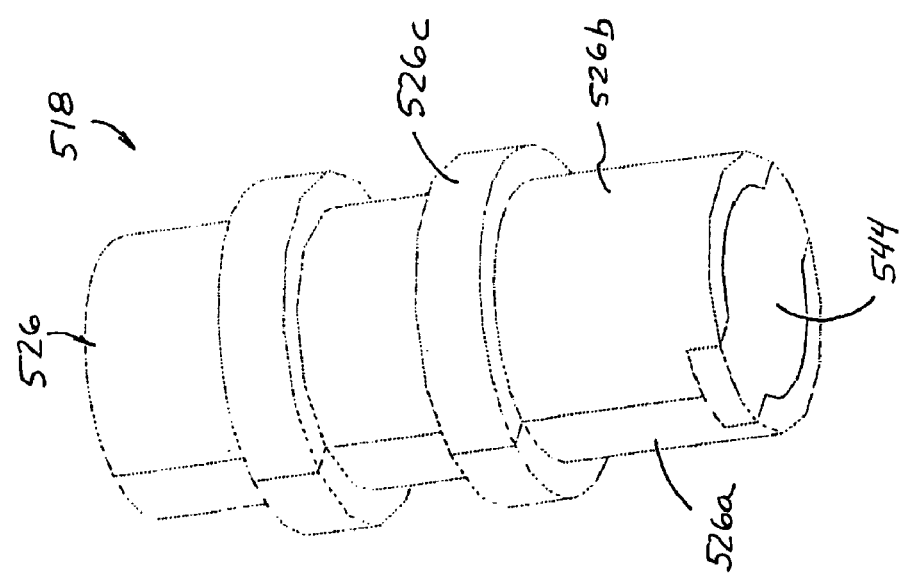
FIG. 16 is a perspective view of the illumination module of the mirror assembly of FIGS. 13-15.

As shown in FIGS. 16 and 17, illumination module 518 includes a body or casing or housing 526 that houses one or more illumination sources or LEDs or the like and that includes one or more optics or lenses through which the illumination is transmitted. In the illustrated embodiment, and as best shown in FIG. 17, housing 526 may comprise two halves 526a, 526b that cooperate to define or form a passageway or tube. The housing is mounted in the mirror assembly 510 so that the outer or lower end portion of the housing and the outer lens or optic are generally coplanar with the lower surface of the mirror assembly. Optionally, the housing 526 may include one or more raised ribs or protrusions or rings 526c to assist in mounting or securing or retaining the illumination module at and within the exterior mirror assembly.

The illumination module 518 is operable to back light an icon or indicia or logo and to project the icon or indicia or logo or shadow thereof downward so that a person at the side of the vehicle may view, when the illumination module is activated, the icon or indicia or logo or shadow thereof at the ground adjacent to or proximate the side of the vehicle. In the illustrated embodiment, illumination module 518 includes an icon illumination source or LED 540, a focal lens or optic 542 and a second lens or icon optic 546 with the icon or indicia or logo or emblem established thereat. The icon illumination source 540, focal lens 542 and icon optic 546 are disposed within housing 526 so that illumination emitted by illumination source 540, when activated, is directed along the passageway of the housing and focused at icon optic 546 by focal lens 542, whereby the illumination that transmits through icon optic 546 is directed further downward through the lower or outer lens 544 and toward the ground adjacent to or proximate the side of the vehicle. Thus, a person approaching or standing at the side of the vehicle may view (when the illumination module is activated) the icon or logo or indicia at the ground by the vehicle.

As can be seen in FIG. 17, the icon or indicia or logo may be established at or on a substantially transparent or translucent lens or optic, such that the illumination from icon illumination source 540 passes through the optic 546 and through the outer or lower lens 544 and toward the ground so as to provide ground illumination at the side of the vehicle and to provide a shadow image of the icon or indicia or logo. Thus, the illumination module 518 provides ground illumination at the side of the vehicle, while also providing an enhanced unique or customized appearance of the ground illumination to a person viewing the illuminated area at the side of the vehicle.

Illumination module 518 may function in a similar manner as the illumination modules discussed above, such that a detailed discussion of the illumination modules need not be repeated herein. Optionally, the illumination module may be configured to direct the icon image toward other targeted regions or areas, such as toward the surface of the vehicle door or side of the vehicle to provide the icon or indicia or logo at the vehicle door or side panel of the vehicle (and optionally the icon established at the icon optic may be established or formed to accommodate for the angle at which the icon is directed toward the door or side of the vehicle to reduce distortion of the icon when it is displayed at or projected onto the door or side panel of the vehicle). Optionally, the illumination module may be located at other portions of the vehicle, such as, for example, at an interior portion of the vehicle, such as at an interior rearview mirror assembly of the vehicle, where the illumination module may direct illumination through an icon optic toward an interior surface of the vehicle, such as toward the dashboard or instrument panel or seat area of the vehicle, such as in a similar manner as described above.

Thus, the illumination modules may provide a back lit icon or indicia or logo or emblem to provide enhanced ground illumination at the side of a vehicle. The icon or indicia or logo or emblem may comprise the vehicle manufacturer logo or the like, or may comprise a selected icon or indicia or logo, such as may be selected by the owner of the vehicle. For example, the owner of the vehicle may select a module having a desired icon or indicia or logo element or optic and the selected illumination module may be installed in the vehicle door handle and/or mirror assembly (or elsewhere on the vehicle, such as at or on or in the vehicle door or at or on or in a side panel of the vehicle or the like) to provide the customized or personalized ground illumination function. Such a selection and installation of the illumination module may be performed during manufacturing of the vehicle or as an aftermarket change to the vehicle. The icon illumination module thus may provide a personalized or customized illumination at the side of the vehicle, such as by utilizing aspects of the systems and assemblies described in U.S. Pat. Nos. 7,255,451 and/or 7,289,037; and/or U.S. patent application Serial No. 11/912,576, filed Oct. 25, 2007, now U.S. Pat. No. 7,626,749, which are hereby incorporated herein by reference in their entireties.

Optionally, the illumination module and/or the exterior rearview mirror assembly may incorporate a blind spot indicator device or element and/or a turn signal indicator device or element, such as by utilizing aspects of the devices described in U.S. provisional applications, Ser. No. 61/031,869, filed Feb. 7, 2008; Ser. No. 61/022,450, filed Jan. 21, 2008; Ser. No. 60/954,953; filed Aug. 9, 2007; Ser. No. 60/985,446, filed Nov. 5, 2007; Ser. No. 61/019,478, filed Jan. 7, 2008; Ser. No. 60/853,850, filed Oct. 24, 2006; Ser. No. 60/918,089, filed Mar. 15, 2007; and/or Ser. No. 60/970,687, filed Sep. 7, 2007, and/or U.S. Pat. Nos. 6,198,409; 5,929,786; and 5,786,772, and/or U.S. patent application Serial No. 11/994,471, filed Jan. 2, 2008, now U.S. Pat. No. 7,492,281, and/or PCT Application No. PCT/US07/82099, filed Oct. 22, 2007, which are hereby incorporated herein by reference in their entireties. The signal indicator or indication module may include or utilize aspects of various light modules or systems or devices, such as the types described in U.S. Pat. Nos. 6,227,689; 6,582,109; 5,371,659; 5,497,306; 5,669,699; 5,823,654; 6,176,602; and/or 6,276,821, and/or U.S. patent application Ser. No. 11/520,193, filed Sep. 13, 2006, now U.S. Pat. No. 7,581,859, and/or PCT Application No. PCT/US2006/018567, filed May 16, 2006 and published Nov. 23, 2006 as International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 7,255,451; 7,195,381; 6,717,712; 7,126,456; 6,315,419; 7,097,312; and/or 6,522,451, and/or U.S. provisional applications, Ser. No. 61/031,869, filed Feb. 7, 2008; Ser. No. 61/022,450, filed Jan. 21, 2008; Ser. No. 60/954,953, filed Aug. 9, 2007; and/or Ser. No. 60/939,753, filed May 23, 2007, which are hereby incorporated herein by reference in their entireties.

Figure 18:
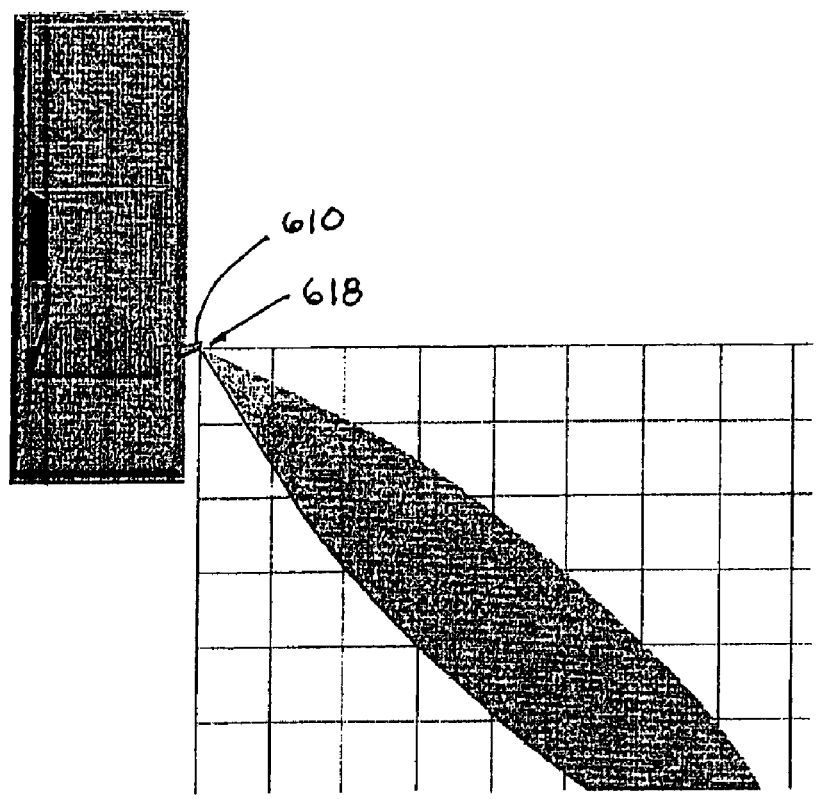
FIG. 18 is a top plan view of a vehicle having a cornering light at an exterior rearview mirror assembly in accordance with the present invention.
Figure 19:
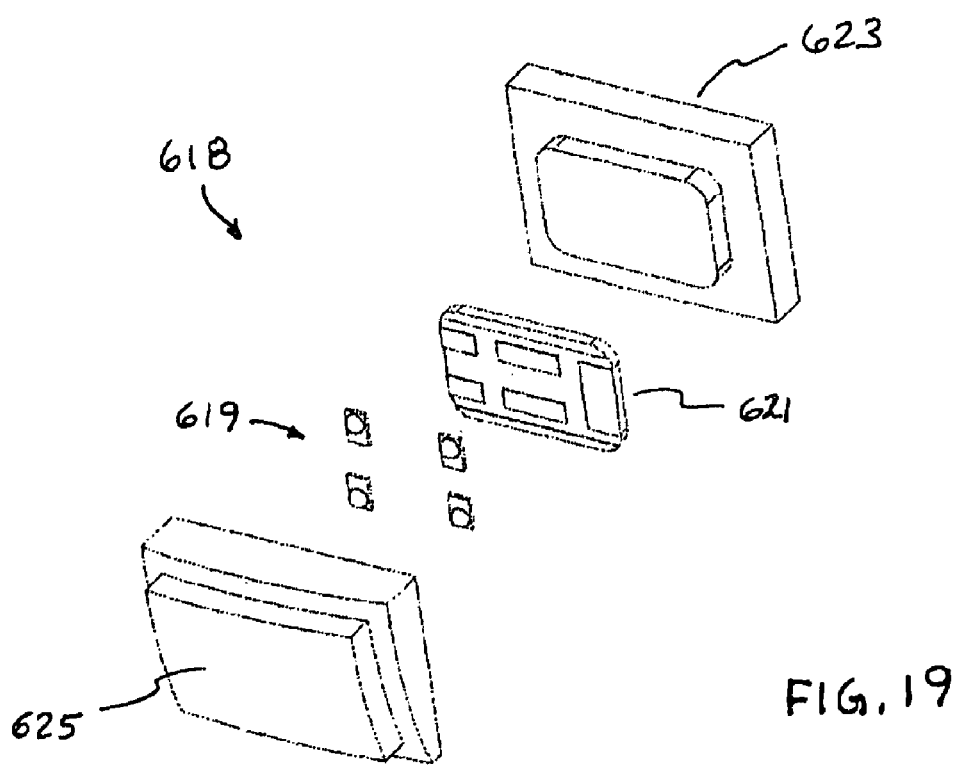
FIG. 19 is an exploded perspective view of a cornering light of the present invention.

Optionally, and with reference to FIGS. 18 and 19, an exterior rearview mirror assembly 610 may include a cornering light module or assembly 618 to provide illumination generally forwardly and sidewardly of the vehicle to provide enhanced illumination during turning maneuvers of the vehicle. For example, cornering light module 618 may include one or more illumination sources 619 at a circuit element 621 (such as a printed circuit board or the like), which is disposed at a back plate 623 and encased within a housing having a lens or optic 625. The side lighting functions to improve the vision of the driver of the vehicle when turning the around a corner or curve in the road. The cornering light module may operate in conjunction with the respective turn signal so as to be activated when the turn signal at that side of the vehicle is activated. The light module may provide a constant illumination at the side of the vehicle while the turn signal flashes. The cornering light module may comprise any suitable illumination source or sources, such as, for example, one or more LEDs, one or more light bulbs, a light pipe and/or the like. Although shown and described as being disposed at the exterior mirror assembly, it is envisioned that the cornering light module may be mounted at any suitable location at the vehicle, such as at or within the door handle assembly.

Thus, the cornering light module may provide substantially constant illumination that is projected outward, such as in response to activation of the turn signal by the driver of the vehicle. Optionally, the cornering light module may provide a sideward illumination in response to the high beams of the vehicle being activated, in order to provide additional lighting of the road or shoulder sidewardly of the vehicle and rearward of the area encompassed by the front headlights when in their high beam state. In such an application, the sideward lighting function may be deactivated when the headlights are in their low beam state.

Optionally, the illumination module may provide an active cornering light for curved or winding roads, such as by using a cluster of lights and/or an alignment of lights that are tied to the steering controls of the vehicle. Thus, the lights (such as a row of lights with some of the lights illuminating further sidewardly than some of the other lights) may illuminate in a progressively outward direction depending on the position or steering angle of the steering wheel or front wheels/tires of the vehicle, and then the lights may progressively deactivate in the opposite direction as the steering wheel and/or wheels/tires are turned back to a center or straight orientation. Thus, the lights may illuminate a greater sideward area in response to a detection of the vehicle undergoing a sharper turn so as to enhance the viewing by the driver of the area to the side of the vehicle and toward where the vehicle is being steered, while limiting sideward illumination when the vehicle is being driven in a generally straight or slightly curved path.

Optionally, the illumination module may also comprise a ground illumination light or puddle lamp, which provides downwardly directed illumination (and which may provide a back lit icon or indicia or logo or the like), such as described above. Optionally, the illumination module may comprise a cornering light and a puddle lamp and turn signal light, and may have a wrap-around style turn signal at the exterior mirror that may be fitted with a prism lens or the like to project light in the appropriate direction and/or toward the targeted location. The illumination module thus may include one or more illumination sources and one or more lenses or optics or light pipes or the like to distribute or direct illumination toward the appropriate targeted areas.

Therefore, the present invention provides an illumination module at a vehicle door handle or exterior rearview mirror assembly for illuminating the door handle region or cup region of the vehicle door and/or the ground area at or adjacent to or proximate the side of the vehicle and generally below the vehicle door handle assembly or mirror assembly. The illumination source may thus be temporarily activated as a person approaches or contacts the handle to case grasping of the handle and thus opening of the door in nighttime conditions. The illumination sources may illuminate the handle region or cup region of the door, and may provide ground illumination of the area by the vehicle, similar to safety illumination sources such as the types described in U.S. Pat. Nos. 5,371,659, 5,669,699, 5,823,654 and 5,497,305, which are hereby incorporated herein by reference in their entireties. When activated, the illumination source preferably draws a low or minimal amount of energy from a power source, such as a vehicle battery (not shown) or the like, such that the battery or power source is not overly drained during the period of time that the illumination source is activated.

Optionally, the door handle assembly or mirror assembly or illumination module may include or may be associated with an antenna for receiving signals from or communicating with a remote device. For example, the antenna (such as, for example, an antenna of the types described in U.S. Pat. No. 6,977,619, which is hereby incorporated herein by reference in its entirety) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408; and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208; and/or 6,568,839, all of which are hereby incorporated herein by reference in their entireties), or the vehicle ignition, or any other desired system, while remaining within the spirit and scope of the present invention.

Optionally, the door handle assembly of the present invention may include a soft touch handle portion, such as utilizing the principles described in U.S. Pat. Nos. 6,349,450; 6,550,103; and 6,907,643, which are hereby incorporated herein by reference in their entireties. Optionally, the door handle assembly may include an antenna or the like, such as for sensing or transmitting signals, such as described in U.S. Pat. No. 6,977,619, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A door handle assembly for a door of a vehicle, said door handle assembly being mounted to a handle region of a vehicle door, said door handle assembly comprising:

a cap portion mountable to a vehicle door;

a handle portion movably mountable to the vehicle door and moveable relative to said cap portion to actuate a locking mechanism of the door to open the door;

an illumination module, said illumination module comprising at least one illumination source and being operable to illuminate the handle region of the vehicle door and to illuminate a ground region adjacent to the vehicle and generally below said door handle assembly;

wherein said illumination module comprises a housing that is overmolded over said at least one illumination source to substantially seal said at least one illumination source within said housing; and wherein said housing defines a pocket illumination portion for directing illumination from said at least one illumination source toward the door handle pocket and a ground illumination portion for directing illumination from said at least one illumination source toward the ground.

2. The door handle assembly of claim 1, wherein said illumination module is operable to provide diffuse illumination at the handle region of the vehicle door and at the ground region adjacent to the vehicle and generally below said door handle assembly.

3. The door handle assembly of claim 1, wherein said illumination module is disposed at an end region of said handle portion.

4. The door handle assembly of claim 1, wherein said illumination module is disposed at an end region of said handle portion that is at said cap portion.

5. The door handle assembly of claim 1, wherein said illumination module is disposed at an end region of said handle portion that is generally opposite said cap portion.

6. The door handle assembly of claim 1, wherein said illumination module is disposed at said cap portion.

7. The door handle assembly of claim 1, wherein said illumination module comprises at least one optic element for directing illumination from said at least one illumination source toward the handle region of the vehicle door and toward the ground region adjacent to the vehicle and generally below said door handle assembly.

8. The door handle assembly of claim 1, wherein said illumination module comprises a substantially sealed module.

9. The door handle assembly of claim 1 further comprising an icon established in a portion of said door handle assembly, at least one illumination source being operable to back light said icon to provide at least one of (a) a backlit icon at said door handle assembly and (b) a backlit icon at the ground proximate the side of the vehicle.

10. An illumination module for a door handle assembly of a vehicle door, said illumination module comprising:

at least one illumination source and circuitry;

a housing overmolded at least partially around said circuitry and said at least one illumination source;

a pocket illumination portion and a ground illumination portion at said housing, illumination from said at least one illumination source being directed through said pocket illumination portion and said ground illumination portion; and said housing being configured to mount to a vehicle door handle assembly, whereby said pocket illumination portion and said ground illumination portion are substantially flush with respective exterior surfaces of the door handle assembly, said illumination source being operable to illuminate the handle region of the vehicle door and to illuminate a ground region adjacent to the vehicle and generally below said door handle assembly when said illumination module is mounted to the vehicle door handle.

11. The illumination module of claim 10, wherein said illumination module is operable to provide diffuse illumination at the handle region of the vehicle door and at the ground region adjacent to the vehicle and generally below said door handle assembly.

12. The illumination module of claim 10 further comprising at least one optic element for directing illumination from said at least one illumination source toward and through said pocket illumination portion and toward and through said ground illumination portion.

* * * * *

UNITED STATES PATENT AND TRADEMARK OFFICE
CERTIFICATE OF CORRECTION

| | | |
|---|---|---|
| PATENT NO. | : 8,333,492 B2 | Page 1 of 1 |
| APPLICATION NO. | : 12/596891 | |
| DATED | : December 18, 2012 | |
| INVENTOR(S) | : Dingman et al. | |

It is certified that error appears in the above-identified patent and that said Letters Patent is hereby corrected as shown below:

Column 18
Line 46, Claim 1, "moveable" should be --movable--

Signed and Sealed this
Nineteenth Day of March, 2013

Teresa Stanek Rea
*Acting Director of the United States Patent and Trademark Office*